United States Patent
Kimura et al.

(10) Patent No.: US 8,293,150 B2
(45) Date of Patent: Oct. 23, 2012

(54) NEAR-INFRARED ABSORBING MATERIAL

(75) Inventors: Keizo Kimura, Kanagawa (JP); Osamu Uchida, Kanagawa (JP); Katsuyoshi Yamakawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 588 days.

(21) Appl. No.: 12/295,281

(22) PCT Filed: Mar. 12, 2007

(86) PCT No.: PCT/JP2007/055319
§ 371 (c)(1),
(2), (4) Date: Sep. 29, 2008

(87) PCT Pub. No.: WO2007/111154
PCT Pub. Date: Oct. 4, 2007

(65) Prior Publication Data
US 2010/0224839 A1    Sep. 9, 2010

(30) Foreign Application Priority Data
Mar. 29, 2006   (JP) ................................. 2006-092317

(51) Int. Cl.
| F21V 9/04 | (2006.01) |
| F21V 9/06 | (2006.01) |
| G02B 5/22 | (2006.01) |
| G02B 5/26 | (2006.01) |
| G03C 1/00 | (2006.01) |
| G03F 7/00 | (2006.01) |

(52) U.S. Cl. ........ 252/587; 359/350; 359/359; 359/885; 427/160; 430/270.1; 430/616; 430/944

(58) Field of Classification Search .................. 252/587, 252/299.01; 548/427, 156; 546/181, 94; 544/350; 359/885, 359, 350; 430/616, 944, 430/270.1; 427/160
See application file for complete search history.

(56) References Cited

U.S. PATENT DOCUMENTS

| 5,024,926 A | 6/1991 | Itoh et al. | |
| 5,384,069 A * | 1/1995 | Yoshinaga et al. | ........ 252/299.01 |
| 5,604,281 A | 2/1997 | Kamei et al. | |
| 6,863,845 B2 * | 3/2005 | Saito et al. | ..................... 252/587 |
| 2004/0184173 A1* | 9/2004 | Kobayashi et al. | ........... 359/885 |
| 2005/0008969 A1 | 1/2005 | Miyako et al. | |
| 2005/0277729 A1 | 12/2005 | Tsunemine et al. | |
| 2006/0073407 A1* | 4/2006 | Yamanobe et al. | ........ 430/270.1 |

FOREIGN PATENT DOCUMENTS

| JP | 2-43269 A | 2/1990 |
| JP | 2-138382 A | 5/1990 |
| JP | 8-3870 A | 1/1996 |
| JP | 8-27371 A | 1/1996 |
| JP | 11-167350 A | 6/1999 |
| JP | 11-231126 A | 8/1999 |
| JP | 2001-133624 A | 5/2001 |
| JP | 2001-174626 A | 6/2001 |
| JP | 2003-114323 A | 4/2003 |
| JP | 2003-268312 A | 9/2003 |
| JP | 2004-361525 A | 12/2004 |
| JP | 2005-49847 A | 2/2005 |
| JP | 2005-181966 A | 7/2005 |

OTHER PUBLICATIONS

Database WPI Week 200212, Thomson Scientific, London, GB, XP002607077, Jun. 29, 2001.
European Search Report dated Nov. 11, 2010 for Application No. 07738766.0.

* cited by examiner

*Primary Examiner* — Bijan Ahvazi
(74) *Attorney, Agent, or Firm* — Birch, Stewart, Kolasch & Birch, LLP

(57) ABSTRACT

The invention provides a near-infrared absorbing material, including: at least one of at least one singlet oxygen scavengers, at least one radical scavenger, and at least one antioxidant; and at least one near-infrared absorbing compound obtained by oxidation of a compound represented by the following Formula (II).

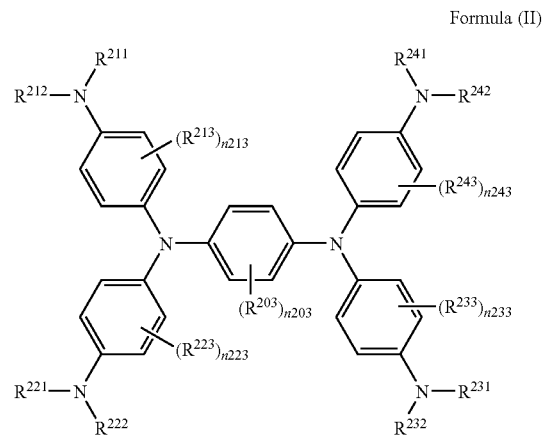

In the formula, $R^{211}$, $R^{212}$, $R^{221}$, $R^{222}$, $R^{231}$, $R^{232}$, $R^{241}$ and $R^{242}$ independently represent a hydrogen atom or an aliphatic or aromatic group; $R^{203}$, $R^{213}$, $R^{223}$, $R^{233}$ and $R^{243}$ independently represent a substituent; and $n_{203}$, $n_{213}$, $n_{223}$, $n_{233}$ and $n_{243}$ independently represent an integer of 0 to 4.

4 Claims, No Drawings

NEAR-INFRARED ABSORBING MATERIAL

TECHNICAL FIELD

The invention relates to a near-infrared absorbing material, and in particular to a near-infrared absorbing material having good light resistance together with good other physical properties that plays an important role in the field of optoelectronics as near-infrared absorbing filters, near-infrared absorbing colored resin compositions, liquid crystal display elements, optical cards, optical recording media, and protective glasses.

BACKGROUND ART

Near-infrared absorbing dyes, substantially absorbing no visible light but absorbing infrared light, are used in various optoelectronic products such as near-infrared absorbing filters. These dyes may be placed in an atmosphere of high temperature and/or high humidity, and/or exposed to light depending on the application. In such cases, the dyes may decompose. Efforts to improve resistance to heat, moisture and light by modifying the structures of dyes have been being made. For example, it is found naphthalocyanine dyes with particular structures have high resistance with respect thereto (see Japanese Patent Application Laid-Open (JP-A) Nos. H02-4685, H02-43269 and 1102-138382). However, it is difficult for these dyes not only to have such resistance but also to have good other physical properties such as absorption wavelength and solubility. Prevention of photo-degradation of dyes by combined use of a near-infrared absorbing dye and an ultraviolet-absorbing material is also known (see JP-A Nos. 1111-167350, 2001-133624 and 2005-181966), but none of the combinations sufficiently suppress the photo-degradation, and thus, there exists a need for near infrared absorbing dyes with further improved light resistance.

Accordingly, there is a need for a near-infrared absorbing material having good light resistance together with good other physical properties that plays an important role in opto-electronic applications such as near-infrared absorbing filters, near-infrared absorbing colored resin compositions, liquid crystal display elements, optical cards, optical recording media, and protective glasses.

DISCLOSURE OF INVENTION

The invention has been made under the aforementioned circumstances.

The invention provides a near-infrared absorbing material, including: at least one compound of at least one singlet oxygen scavenger, at least one radical scavenger and at least one antioxidant; and a near-infrared absorbing compound obtained by oxidation of a compound represented by the following Formula (II).

Formula (II)

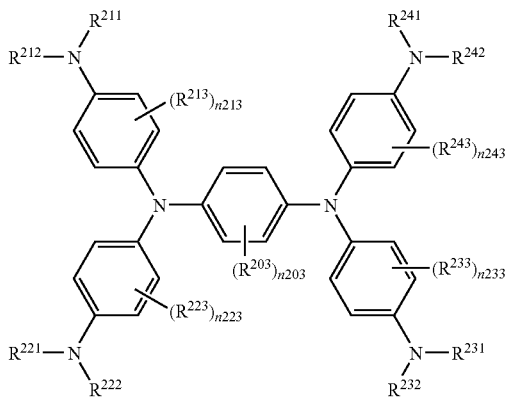

In the formula, $R^{211}$, $R^{212}$, $R^{221}$, $R^{222}$, $R^{231}$, $R^{232}$, $R^{241}$ and $R^{242}$ independently represent a hydrogen atom, an aliphatic group or an aromatic group; $R^{203}$, $R^{213}$, $R^{223}$, $R^{233}$ and $R^{243}$ independently represent a substituent; and $n_{203}$, $n_{213}$, $n_{223}$, $n_{233}$ and $n_{243}$ independently represent an integer of 0 to 4.

BEST MODE FOR CARRYING OUT THE INVENTION

Hereinafter, the invention will be described in detail with reference to embodiments.

The invention relates to a near-infrared absorbing material including 1) at least one compound of at least one singlet oxygen scavenger, at least one radical scavenger, and at least one antioxidant [compound or component 1)]; and 2) a near-infrared absorbing compound obtained by oxidation of a compound represented by the following Formula (II) [compound or component 2)]:

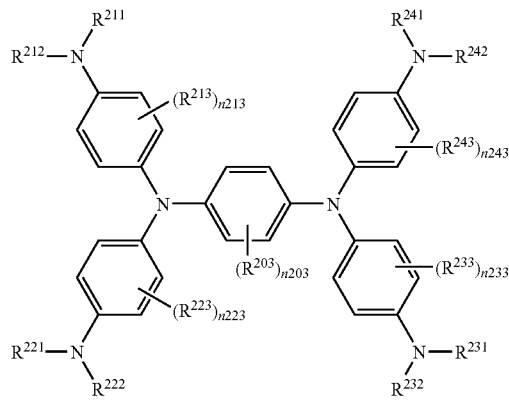

In Formula (II), $R^{211}$, $R^{212}$, $R^{221}$, $R^{222}$, $R^{231}$, $R^{232}$, $R^{341}$ and $R^{242}$ independently represent a hydrogen atom or an aliphatic group or an aromatic group; $R^{203}$, $R^{213}$, $R^{223}$, $R^{233}$ and $R^{243}$ independently represent a substituent; and $n_{203}$, $n_{213}$, $n_{223}$, $n_{233}$ and $n_{243}$ independently represent an integer of 0 to 4.

In an embodiment of the invention, it is preferable that the near-infrared absorbing material further contains 3) at least one compound of ultraviolet absorbents and fluorescent brighteners, and each of these compounds preferably has a maximum spectroscopic absorption wavelength when in solution of 410 nm or less in the range of 270 to 1,600 nm [compound or component 3)].

<Maximum Spectroscopic Absorption Wavelength>

The maximum spectroscopic absorption wavelength will be described.

The maximum spectroscopic absorption wavelength is determined from an absorption spectrum in a solution containing the aforementioned compound, and any of solvents in which the compound is soluble may be used in the invention. The solvent may be an organic or inorganic solvent or water, or a mixture thereof. In the invention, the maximum spectroscopic absorption wavelength is preferably in the range specified in the invention, under conditions where the compound is soluble in the solvent at a temperature.

Examples of the organic solvent include amide solvents (such as N,N-dimethylformamide, N,N-dimethylacetamide, and 1-methyl-2-pyrrolidone), sulfone solvents (such as sulfolane), sulfoxide solvents (such as dimethylsulfoxide), ureide solvents (such as tetramethylurea), ether solvents (such as dioxane, tetrahydrofuran, and cyclopentyl methyl ether), ketone solvents (such as acetone and cyclohexanone), hydrocarbon solvents (such as toluene, xylene, and n-decane), halogenated solvents (such as tetrachloroethane, chlorobenzene, and chloronaphthalene), alcohol solvents (such as methanol, ethanol, isopropyl alcohol, ethylene glycol, cyclohexanol, and phenol), pyridine solvents (such as pyridine, γ-picoline, and 2,6-lutidine), ester solvents (such as ethyl acetate and butyl acetate), carboxylic acid solvents (such as acetic acid and propionic acid), nitrile solvents (such as acetonitrile), sulfonic acid solvents (such as methanesulfonic acid), and amine solvents (such as triethylamine and tributylamine). Examples of the inorganic solvent include sulfuric acid and phosphoric acid.

Among these solvents, at least one of amide solvents, sulfone solvents, sulfoxide solvents, ureide solvents, ether solvents, ketone solvents, halogenated solvents, alcohol solvents, ester solvents, and nitrile solvent is preferably used at the maximum spectroscopic absorption wavelength of the compound 3); and at least one of ethyl acetate and N,N-dimethylformamide is more preferably used.

The concentration of the compound(s) whose maximum spectroscopic absorption wavelength is measured is such that the maximum wavelength of the spectroscopic absorption can be determined. The concentration is preferably in the range of $1 \times 10^{-13}$ to $1 \times 10^{-7}$ mol/liter. There is no particular limit to the measurement temperature. However, the temperature is preferably 0° C. to 80° C., and, if the compound is soluble in the solvent at room temperature, more preferably room temperature (25° C.).

The analyzer for use may be an ordinary spectroscopic absorption analyzer (such as U-4100 spectrophotometer manufactured by Hitachi High-Technologies Corp.).

<Groups in the Invention>

The groups used in the invention will be described in detail, before the compound is described.

The aliphatic group in the present specification means an unsubstituted alkyl group, a substituted alkyl group, an unsubstituted alkenyl group, a substituted alkenyl group, an unsubstituted alkynyl group, a substituted alkynyl group, an unsubstituted aralkyl group, or a substituted aralkyl group. The alkyl group may be a branched or cyclic group. The number of carbon atoms in the unsubstituted alkyl group is preferably 1 to 20, and more preferably 1 to 18. The alkyl moiety in the substituted alkyl group is the same as the unsubstituted alkyl group. The alkenyl group may be a branched or cyclic ring. The number of carbon atoms in the unsubstituted alkenyl group is preferably 2 to 20, and more preferably 2 to 18. The alkenyl moiety in the substituted alkenyl group is the same as the unsubstituted alkenyl group. The alkynyl group may be a branched or cyclic group. The number of carbon atoms in the unsubstituted alkynyl group is preferably 2 to 20, and more preferably 2 to 18. The alkynyl moiety in the substituted alkynyl group is the same as the unsubstituted alkynyl group above. The alkyl moiety in the unsubstituted aralkyl group and the substituted aralkyl group is the same as the aforementioned alkyl group. The aryl moiety in the unsubstituted aralkyl group and the substituted aralkyl group is the same as an aryl group described later.

Examples the at least one substituent in the substituted alkyl groups, the substituted alkenyl groups or the substituted alkynyl groups, or in the substituted alkyl moieties of the substituted aralkyl groups include halogen atoms (such as chlorine, bromine, and iodine atoms); alkyl groups [linear, branched, or cyclic substituted or unsubstituted alkyl group. Typical examples of thereof include alkyl groups (preferably alkyl group having 1 to 30 carbon atoms, such as methyl, ethyl, n-propyl, isopropyl, t-butyl, n-octyl, eicosyl, 2-chloroethyl, 2-cyanoethyl, and 2-ethylhexyl groups), cycloalkyl groups (preferably, substituted or unsubstituted cycloalkyl group having 3 to 30 carbon atoms, such as cyclohexyl, cyclopentyl, and 4-n-dodecylcyclohexyl groups), bicycloalkyl groups (preferably, substituted or unsubstituted bicycloalkyl groups having 5 to 30 atoms, i.e., monovalent groups obtained by removing one hydrogen atom from bicycloalkanes having 5 to 30 carbon atoms, such as bicyclo[1,2,2] heptan-2-yl, and bicyclo[2,2,2]octan-3-yl groups), tricyclic structures having three or more ring structures. The alkyl group in a substituent described later (such as the alkyl moiety of an alkylthio group) has the meaning the same as the described above]; alkenyl groups [linear, branched, or cyclic substituted or unsubstituted alkenyl groups, including alkenyl groups (preferably, substituted or unsubstituted alkenyl groups having 2 to 30 carbon atoms, such as vinyl, allyl, prenyl, geranyl, and oleyl groups), cycloalkenyl groups (preferably, substituted or unsubstituted cycloalkenyl groups having 3 to 30 carbon atoms, i.e., monovalent groups obtained by removing one hydrogen atom from cycloalkenes having 3 to 30 carbon atoms such as 2-cyclopenten-1-yl and 2-cylcohexen-1-yl groups), and bicycloalkenyl groups (substituted or unsubstituted bicycloalkenyl groups, preferably substituted or unsubstituted bicycloalkenyl groups having 5 to 30 carbon atoms, i.e., monovalent groups obtained by removing one hydrogen atom from bicycloalkenes having a double bond, such as bicyclo[2,2,1]hept-2-en-1-yl and bicyclo[2,2,2]oct-2-en-4-yl groups)]; alkynyl groups (preferably substituted or unsubstituted alkynyl groups having 2 to 30 carbon atoms, such as ethynyl, propargyl, and trimethylsilylethynyl groups);

aryl groups (preferably substituted or unsubstituted aryl groups having 6 to 30 carbon atoms, such as phenyl, p-toluoyl, naphthyl, m-chlorophenyl, and o-hexadecanoylaminophenyl groups); heterocyclic groups (preferably monovalent groups substituted or unsubstituted aromatic or nonaromatic heterocyclic groups obtained by removing one hydrogen atom from five- or six-membered heterocycle, and more preferably five- or six-membered heteroaromatic ring groups having 3 to 30 carbon atoms, such as 2-furyl, 2-thienyl, 2-pyrimidinyl, and 2-benzothiazolyl groups); a cyano group; a hydroxyl group; a nitro group; a carboxyl group; alkoxy groups (preferably substituted or unsubstituted alkoxy groups having 1 to 30 carbon atoms, such as methoxy, ethoxy, isopropoxy, t-butoxy, n-octyloxy, and 2-methoxyethoxy groups); aryloxy groups (preferably substituted or unsubstituted aryloxy groups having 6 to 30 carbon atoms, such as phenoxy, 2-methylphenoxy, 4-t-butylphenoxy, 3-nitrophenoxy, and 2-tetradecanoylaminophenoxy groups); silyloxy groups (preferably silyloxy groups having 3 to 20 carbon atoms, such as trimethylsilyloxy and t-butyldimethylsilyloxy groups); heterocyclic oxy groups (preferably substituted or unsubstituted heterocyclic oxy groups having 2 to 30 carbon atoms, such as 1-phenyltetrazole-5-oxy and 2-tetrahydropyranyloxy groups); acyloxy groups (preferably a formyloxy group, substituted or unsubstituted alkylcarbonyloxy groups having 2 to 30 carbon atoms and substituted and unsubstituted arylcarbonyloxy groups having 6 to 30 carbon atoms, such as formyloxy, acetyloxy, pivaloyloxy, stearoyloxy, benzoyloxy, an p-methoxyphenylcarbonyloxy groups); carbamoyloxy groups (preferably substituted or unsubstituted carbamoyloxy groups having 1 to 30 carbon atoms, such as N,N-dimethylcarbamoyloxy, N,N-diethylcarbamoyloxy, morpholinocarbonyloxy, N,N-di-n-octylaminocarbonyloxy, and N-n-octylcarbamoyloxy groups); alkoxycarbonyloxy groups (preferably substituted or unsubstituted alkoxycarbonyloxy groups having 2 to 30 carbon atoms, such as methoxycarbonyloxy, ethoxycarbonyloxy, t-butoxycarbonyloxy, and n-octylcarbonyloxy groups); aryloxycarbonyloxy groups (preferably substituted or unsubstituted aryloxycarbonyloxy groups having 7 to 30 carbon atoms, such as phenoxycarbonyloxy, p-methoxyphenoxycarbonyloxy, and p-n-hexadecyloxyphenoxycarbonyloxy groups);

amino groups (preferably an amino group, substituted or unsubstituted alkylamino groups having 1 to 30 carbon atoms and substituted or unsubstituted anilino groups having 6 to 30 carbon atoms, such as amino, methylamino, dimethylamino, anilino, N-methyl-anilino, and diphenylamino groups); acylamino groups (preferably a formylamino group, substituted or unsubstituted alkylcarbonylamino groups having 1 to 30 carbon atoms, and substituted or unsubstituted arylcarbonylamino groups having 6 to 30 carbon atoms, such as formylamino, acetylamino, pivaloylamino, lauroylamino, benzoylamino, and 3,4,5-tri-n-octyloxyphenylcarbonylamino groups); aminocarbonylamino groups (preferably substituted or unsubstituted aminocarbonylamino groups having 1 to 30 carbon atoms, such as carbamoylamino, N,N-dimethylaminocarbonyoamino, N,N-diethylaminocarbonylamino, and morpholinocarbonylamino groups); alkoxycarbonylamino groups (preferably substituted or unsubstituted alkoxycarbonylamino groups having 2 to 30 carbon atoms, such as methoxycarbonylamino, ethoxycarbonylamino, t-butoxycarbonylamino, n-octadecyloxycarbonylamino, and N-methylmethoxycarbonylamino groups); aryloxycarbonylamino groups (preferably substituted or unsubstituted aryloxycarbonylamino groups having 7 to 30 carbon atoms, such as phenoxycarbonylamino, p-chlorophenoxycarbonylamino, and m-n-octyloxyphenoxycarbonylamino groups); sulfamoylamino groups (preferably substituted or unsubstituted sulfamoylamino groups having 0 to 30 carbon atoms, such as sulfamoylamino, N,N-dimethylaminosulfonylamino, and N-n-octylaminosulfonylamino groups); alkyl- and aryl-sulfonylamino groups (preferably substituted or unsubstituted alkylsulfonylamino groups having 1 to 30 carbon atoms and substituted or unsubstituted arylsulfonylamino groups having 6 to 30 carbon atoms, such as methylsulfonylamino, butylsulfonylamino, phenylsulfonylamino, 2,3,5-trichlorophenylsulfonylamino, and p-methylphenylsulfonylamino groups); a mercapto group;

alkylthio groups (preferably substituted or unsubstituted alkylthio groups having 1 to 30 carbon atoms, such as methylthio, ethylthio, and n-hexadecylthio groups); arylthio groups (preferably substituted or unsubstituted arylthio groups having 6 to 30 carbon atoms, such as phenylthio, p-chlorophenylthio, and m-methoxyphenylthio groups); heterocyclic thio groups (preferably substituted or unsubstituted heterocyclic thio groups having 2 to 30 carbon atoms, such as 2-benzothiazolylthio and 1-phenyltetrazol-5-ylthio groups); sulfamoyl groups (preferably substituted or unsubstituted sulfamoyl groups having 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N-(N'-phenylcarbamoyl)sulfamoyl groups); a sulfo group; alkyl- or aryl-sulfinyl groups (preferably substituted or unsubstituted alkylsulfinyl groups having 1 to 30 carbon atoms and substituted or unsubstituted arylsulfinyl group having 6 to 30 carbon atoms, such as methylsulfinyl, ethylsulfinyl, phenylsulfinyl, and p-methylphenylsulfinyl groups); alkyl- or aryl-sulfonyl groups (preferably substituted or unsubstituted alkylsulfonyl groups having 1 to 30 carbon atoms and substituted or unsubstituted arylsulfonyl groups having 6 to 30 carbon atoms, such as methylsulfonyl, ethylsulfonyl, phenylsulfonyl, and p-methylphenylsulfonyl groups); acyl groups (preferably a formyl group, substituted or unsubstituted alkylcarbonyl groups having 2 to 30 carbon atoms, substituted or unsubstituted aryloxycarbonyl groups having 7 to 30 carbon atoms, and substituted or unsubstituted heterocyclic carbonyl groups having 4 to 30 carbon atoms including a carbon atom that is bonded to a carbonyl group, such as acetyl, pivaloyl, 2-chloroacetyl, stearoyl, benzoyl, p-n-octyloxyphenylcarbonyl, 2-pyridylcarbonyl, and 2-furylcarbonyl groups); aryloxycarbonyl groups (preferably substituted or unsubstituted aryloxycarbonyl groups having 7 to 30 carbon atoms, such as phenoxycarbonyl, o-chlorophenoxycarbonyl, m-nitrophenoxycarbonyl, and p-t-butylphenoxycarbonyl groups); alkoxycarbonyl groups (preferably substituted or unsubstituted alkoxycarbonyl groups having 2 to 30 carbon atoms, such as methoxycarbonyl, ethoxycarbonyl, t-butoxycarbonyl, and n-octadecyloxycarbonyl groups); carbamoyl groups (preferably substituted or unsubstituted carbamoyl groups having 1 to 30 carbon atoms, such as carbamoyl, N-methylcarbamoyl, N,N-dimethylcarbamoyl, N,N-di-n-octylcarbamoyl, and N-(methylsulfonyl)carbamoyl groups);

aryl- or heterocyclic-azo groups (preferably substituted or unsubstituted aryl azo groups having 6 to 30 carbon atoms, and substituted or unsubstituted heterocyclic azo groups having 3 to 30 carbon atoms, such as phenylazo, p-chlorophenylazo, and 5-ethylthio-1,3,4-thiadiazol-2-ylazo groups); imido groups (preferably, N-succinimido and N-phthalimido groups); phosphino groups (preferably substituted or unsubstituted phosphino groups having 2 to 30 carbon atoms, such as dimethylphosphino, diphenylphosphino, and methylphenoxyphosphino groups); phosphinyl groups (preferably substituted or unsubstituted phosphinyl groups having 2 to 30 carbon atoms, such as phosphinyl, dioctyloxyphosphinyl, and diethoxyphosphinyl groups); phosphinyloxy groups (preferably substituted or unsubstituted phosphinyloxy groups having 2 to 30 carbon atoms, such as diphenoxyphosphinyloxy and dioctyloxyphosphinyloxy groups); phosphinylamino groups (preferably substituted or unsubstituted phosphinylamino groups having 2 to 30 carbon atoms, such as dimethoxyphosphinylamino and dimethylaminophosphinylamino groups); and silyl groups (preferably substituted or unsubstituted silyl groups having 3 to 30 carbon atoms, such as trimethylsilyl, t-butyldimethylsilyl, and phenyldimethylsilyl groups).

When the exemplary functional groups containing at least one hydrogen atom, groups obtained by replacing at least one of the at least one hydrogen atom with at least one substituent may be used in the invention. Such functional group is, for example, an alkylcarbonylaminosulfonyl group, an arylcarbonylaminosulfonyl group, an alkylsulfonylaminocarbonyl group, or an arylsulfonylaminocarbonyl group. Typical examples thereof include methylsulfonylaminocarbonyl, p-methylphenylsulfonylaminocarbonyl, acetylaminosulfonyl, and benzoylaminosulfonyl groups.

Examples of at least one substituent of the substituted aryl moiety of the substituted aralkyl group include the substituents of the following substituted aryl groups.

In the present specification, the aromatic groups mean unsubstituted aryl groups and substituted aryl groups. These aromatic groups may be bonded to an aliphatic ring, another aromatic ring or a heteroring to form a fused ring. The number of carbon atoms in the aromatic group is preferably 6 to 40, more preferably 5 to 30, and still more preferably 6 to 20. Among them, the aryl group is preferably a phenyl or naphthyl group that may have at least one substituent, and more preferably a phenyl group that may have at least one substituent. Examples of the substituent(s) of the substituted aryl group include those described above as the substituents of the substituted alkyl groups, the substituted alkenyl groups, and the substituted alkynyl group, and substituents of the substituted alkyl moieties of the substituted aralkyl groups.

The heterocyclic group in the present specification contains at least one hetero atom as at least one of the atoms of a ring group. The ring group may be saturated or unsaturated, may be aromatic or aliphatic, may be bonded with another ring to form a fused ring group or a non-fused ring, and may have at least one substituent. The ring is preferably a four- to eight-membered ring.

In the invention, the heterocyclic group is preferably an aromatic five- or six-membered saturated or unsaturated heterocyclic group. The heterocyclic group may be bonded to an aliphatic or aromatic ring or another heterocyclic ring to form a fused ring group. Each of the at least one hetero atom in the heterocyclic group is preferably B, N, O, S, Se or Te. Among them, the at least one hetero atom in the heterocyclic ring preferably includes N, O or S. The heterocyclic ring is preferably a monovalent group having a free carbon atom (the heterocyclic group having a carbon atom that serves as the bonding atom). The number of carbon atoms in the heterocyclic group is preferably 1 to 40, more preferably 1 to 30, and still more preferably 1 to 20. Examples of the saturated heterocyclic groups include pyrrolidine, morpholine, 2-bora-1, 3-dioxolane and 1,3-thiazolidine ring groups. Examples of the unsaturated heterocyclic group include imidazole, thiazole, benzothiazole, benzoxazole, benzotriazole, benzoselenazole, pyridine, pyrimidine and quinoline ring groups. The heterocyclic group may have at least one substituent, and examples of the substituent(s) include the aforementioned substituents of the substituted alkyl groups, the substituted alkenyl groups, and the substituted alkynyl group, and the aforementioned substituents of the substituted alkyl moieties of the substituted aralkyl groups.

<Singlet Oxygen Scavenger, Radical Scavenger and Antioxidant>

Hereinafter, the singlet oxygen scavenger, radical scavenger and antioxidant serving as the component 1) in the invention will be described.

The compound may be any of those which can scavenge singlet oxygen or radical or prevent oxidation. Examples thereof include organic nickel compounds such as SEESORB 612 NH (manufactured by Shipro Kasei Kaisha, Ltd.) and IRGASTAB 2002 (manufactured by Ciba-Geigy Corp. Co., Ltd.); hindered amine compounds such as TINUVIN 744 (manufactured by Ciba-Geigy Corp. Co., Ltd.); phenol compounds such as IRGANOX 1076 (manufactured by Ciba-Geigy Corp. Co., Ltd.); amine compounds such as SUMILIZER 9A (manufactured by Sumitomo Co., Ltd.); sulfur compounds such as SUMILIZER TPM (manufactured by Sumitomo Chemical Co., Ltd.); and phosphorus compounds such as SUMILIZER TPPR (manufactured by Sumitomo Chemical Co., Ltd.). One of these compounds may be used alone or two or more of them may be used together, or at least one of them may be used in combination with at least one ultraviolet absorbent described later. The (total) mole amount of the compound(s) serving as the component (compound) 1) is preferably 0.01 to 10 moles, more preferably 0.05 to 7 moles, still more preferably 0.1 to 5 moles, and most preferably 0.1 to 2 mole with respect to 1 mole of the compound(s) serving as the component 2).

The compound 1) is preferably represented by the following Formula (I-1) or (I-2):

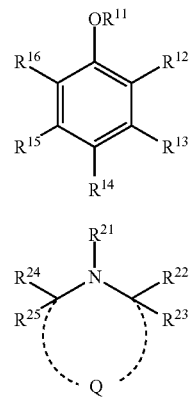

Formula (I-1)

Formula (I-2)

In Formula (I-1), $R^{11}$ represents a hydrogen atom, an aliphatic group, an aromatic group, or a heterocyclic having a carbon atom that bonded to the oxygen atom or hydrolyzable protecting group; $R^{12}$ to $R^{16}$ independently represent a hydrogen atom or a substituent; and $R^{11}$ and $R^{12}$, $R^{12}$ and $R^{13}$, $R^{3}$ and $R^{14}$, $R^{14}$ and $R^{15}$, $R^{15}$ and $R^{16}$, and/or $R^{16}$ and $R^{11}$ may be bonded to each other to form at least one ring.

In Formula (I-2), $R^{21}$ represents a hydrogen atom, an aliphatic group, an acyl group, a sulfonyl group, a sulfinyl group, an oxy radical group or a hydroxyl group; Q represents non-metal atomic group necessary to form, together with two carbon atoms and a nitrogen atom, a five-, six- or seven-membered ring; $R^{22}$ to $R^{25}$ independently represent a hydrogen atom, an aliphatic group, an aromatic group or a heterocyclic group having a carbon atom that is bonded to the carbon or nitrogen atom; and $R^{21}$ and $R^{22}$, $R^{22}$ and $R^{23}$, $R^{24}$ and $R^{25}$, and/or $R^{21}$ and $R^{24}$ may be bonded to each other to form at least one ring.

The hydrolyzable protecting group that can serve as $R^{11}$ in Formula (I-1) is preferably a silyl group, a phosphate group or a group represented by the following Formula (IV):

$$R^{111}-Y^{111}-Z^{111}-$$  Formula (IV)

In the formula, $R^{111}$ represents an aliphatic group, an aromatic group or a heterocyclic group having a carbon atom that bonded to $Y^{111}$; and $Y^{111}$ represents a single bond, —O—, —S—, —N($R^{112}$)—, —C— or a combination thereof. $R^{112}$ represents a hydrogen atom, an aliphatic group, an aromatic group, a heterocyclic group having a carbon atom that bonded to the nitrogen atom, an acyl group or a sulfonyl group. $Z^{111}$ represents —CO— or —SO$_2$—.

$R^{11}$ is preferably a hydrogen atom, an aliphatic group having 1 to 20 carbon atoms, an aromatic group having 6 to 20 carbon atoms, a heterocyclic group having 2 to 20 carbon atoms that includes a carbon atom bonded to the oxygen atom, or a hydrolyzable protecting group having 1 to 20 carbon atoms, more preferably a hydrogen atom, an aliphatic group having 1 to 10 carbon atoms, or a hydrolyzable protecting group having 1 to 10 carbon atoms, still more preferably a hydrogen atom, an aliphatic group having 1 to 8 carbon atoms, a silyl group having 1 to 10 carbon atoms, a phosphate group having 1 to 10 carbon atoms, or a hydrolyzable protecting group having 1 to 10 carbon atoms and having a carbonyl group that bonded to the oxygen atom, still more preferably a hydrogen atom, an aliphatic group having 1 to 4 carbon atoms, a silyl group having 3 to 6 carbon atoms, a phosphate group having 2 to 8 carbon atoms, or a hydrolyzable protecting group having 1 to 8 carbon atoms and having a carbonyl group that bonded to the oxygen atom, still more preferably a hydrogen atom, a trimethylsilyl group, a dimethylphosphate group, a diethylphosphate group, a benzoyl group or an acetyl group, and most preferably a hydrogen atom.

Each of $R^{12}$ to $R^{16}$ is preferably a hydrogen atom, a halogen atom, an alkyl group, an alkenyl group, an alkynyl group, an aryl group, a cyano group, a hydroxyl group, a carboxyl group, an alkoxy group, an aryloxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, a sulfo group, an alkyl- or aryl-sulfonyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group, more preferably a hydrogen atom, a halogen atom, an alkyl group, an alkenyl group, an aryl group, a cyano group, a hydroxyl group, a carboxyl group, an alkoxy group, an aryloxy group, a silyloxy group, an acyloxy group, a carbamoyloxy group, an alkoxycarbonyloxy group, an aryloxycarbonyloxy group, an amino group, an acylamino group, an alkylthio group, an arylthio group, an acyl group, an aryloxycarbonyl group, an alkoxycarbonyl group, a carbamoyl group, or a silyl group, still more preferably a hydrogen atom, a halogen atom, an alkyl group, an aryl group, a hydroxyl group, an alkoxy group, an acyloxy group, an acylamino group, a carbamoyloxy group, or an alkylthio group, still more preferably a hydrogen atom, a halogen atom, an alkyl group, a hydroxyl group, an alkoxy group, or an acylamino group, and most preferably a hydrogen atom or an alkyl group. At least one of $R^{12}$ and $R^{16}$ is preferably a tertiary alkyl group.

In Formula (I-2), $R^{21}$ is preferably a hydrogen atom, an aliphatic group having 1 to 10 carbon atoms, an acyl group having 2 to 10 carbon atoms, or an oxy radial group or a hydroxyl group, more preferably a hydrogen atom, an alkyl group having 1 to 3 carbon atoms, an acyl group having 2 to 7 carbon atoms, an oxy radial group or a hydroxyl group, still more preferably a hydrogen atom, an acetyl group, an oxy radial group or a hydroxyl group, and most preferably a hydrogen atom.

Each of $R^{22}$ to $R^{25}$ is preferably a hydrogen atom or an aliphatic group having 1 to 10 carbon atoms, more preferably a hydrogen atom or an alkyl group having 1 to 5 carbon atoms, and still more preferably a hydrogen atom or an alkyl group having 1 or 2 carbon atoms. Most preferably, each of $R^{22}$ to $R^{25}$ is a methyl group.

Q is preferably non-metal atomic group necessary to form, together with two carbon atoms and a nitrogen atom, a 5 to 7-membered ring having at least one of oxygen, sulfur and nitrogen atom. The at least one hetero atom of the ring is preferably an oxygen atom or a nitrogen atom, and more preferably a nitrogen atom. The ring is preferably a five- to seven-membered ring, and more preferably a six-membered ring. Q most preferably forms, together with the two carbon atoms and the nitrogen atom, a piperidine ring.

Typical examples of the compound 1) in the invention will be shown below, but the invention is not limited by them.

(I-1)

(I-2)

(I-3)

(I-4)

(I-5)

(I-6)

(I-7)

(I-8)
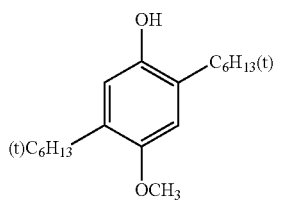
(I-9)
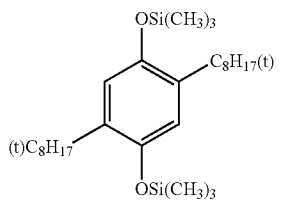
(I-10)
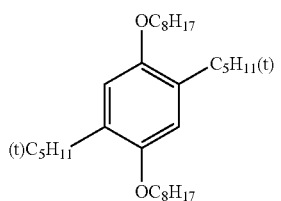
(I-11)
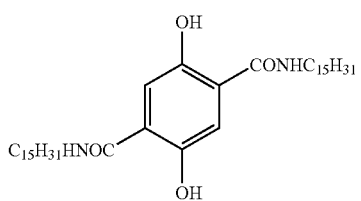
(I-12)
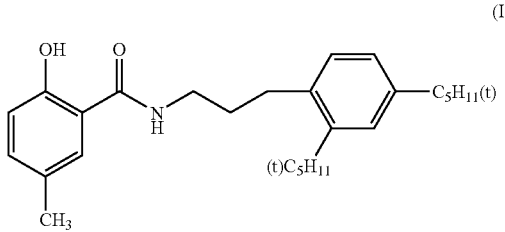
(I-13)
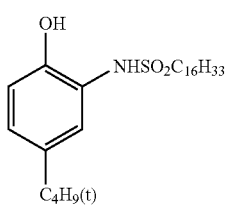
(I-14)
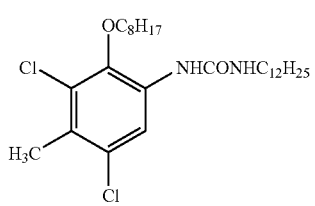
(I-15)
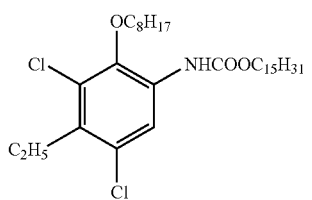
(I-16)
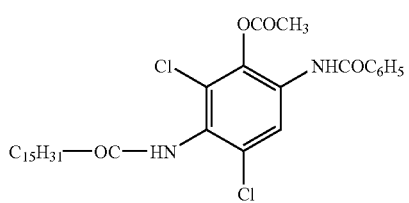
(I-17)
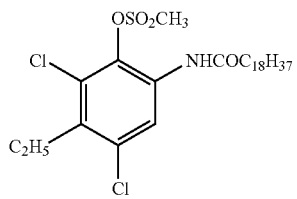
(I-18)
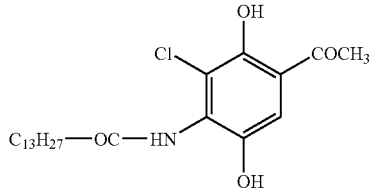
(I-19)
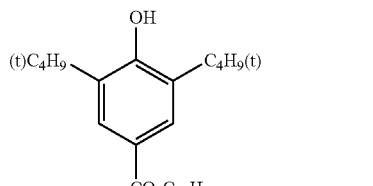
(I-20)
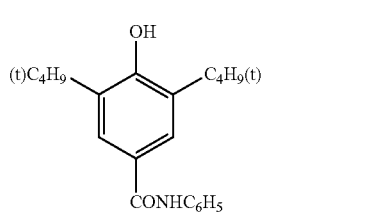
(I-21)
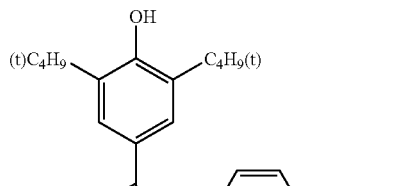
(I-22)
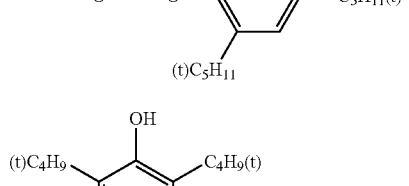
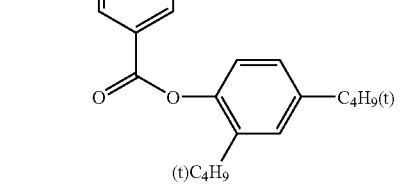

(I-23) 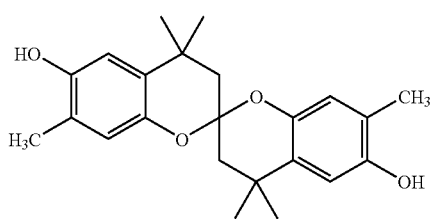
(I-24) 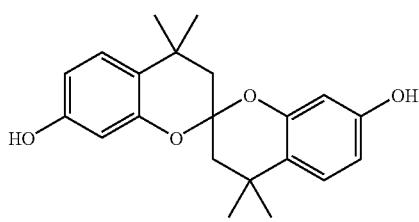
(I-25) 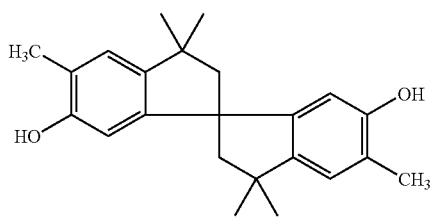
(I-26) 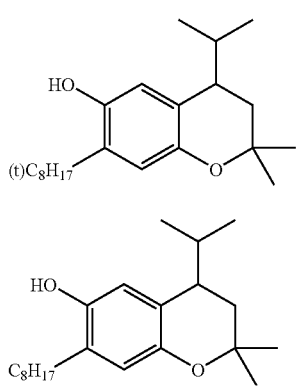
(I-28) 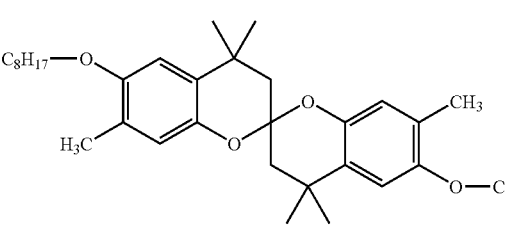
(I-29) 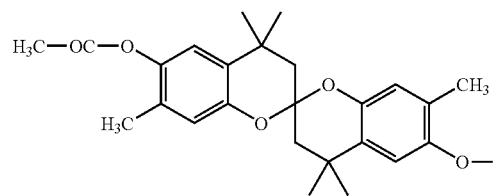
(I-30) 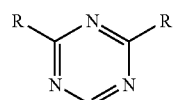
R = 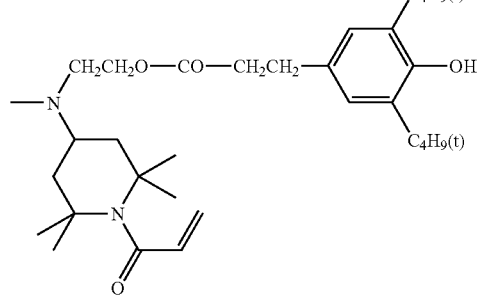
(I-31) 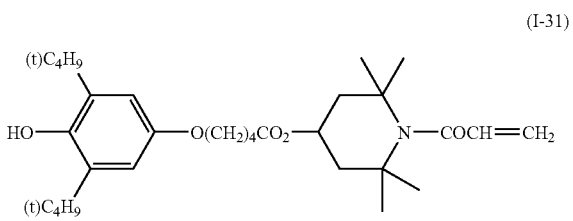
(I-32) 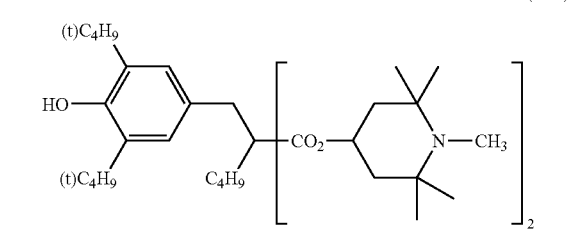
(I-33) 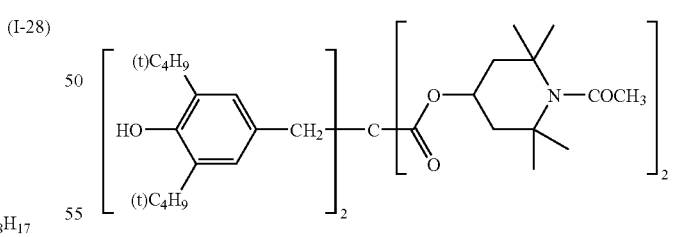
(I-34) 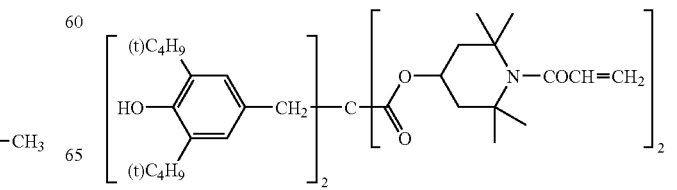

-continued
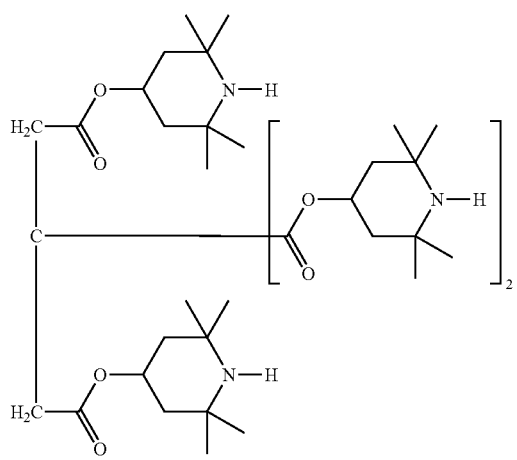 (I-35)
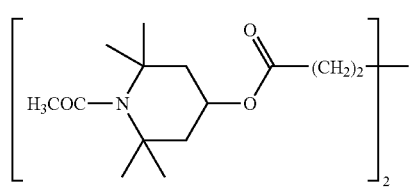 (I-36)
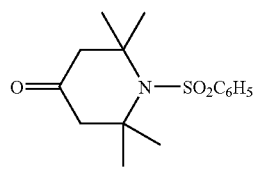 (I-37)
(I-38)
(I-39)
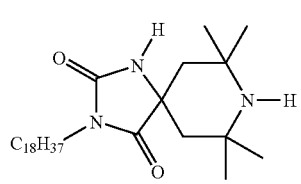 (I-40)
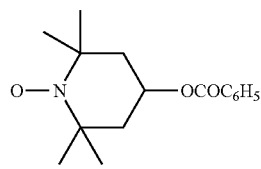 (I-41)
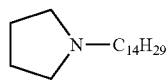 (I-42)
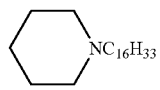 (I-43)
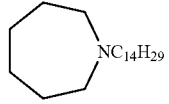 (I-44)
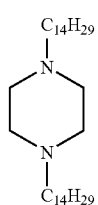 (I-45)
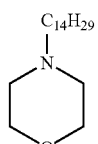 (I-46)
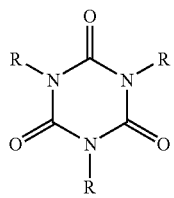 (I-47)
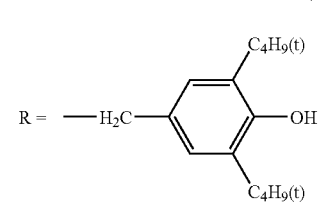 (I-48)
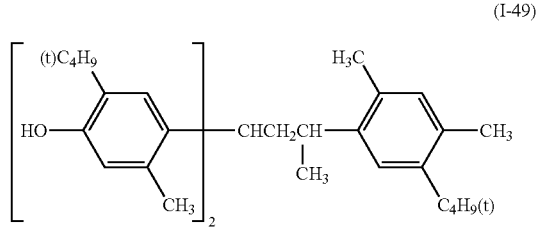 (I-49)
(I-50)

-continued

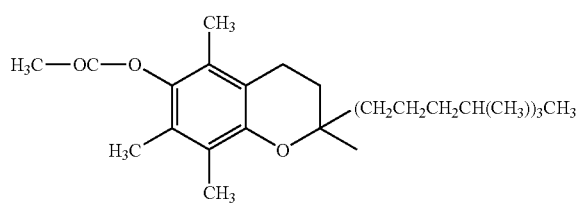
(I-51)

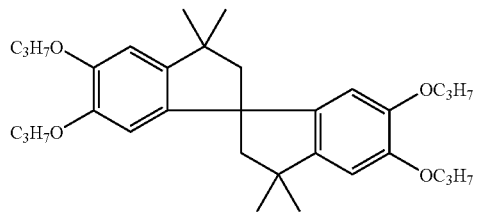
(I-52)

These compounds can be prepared according to the methods the same as or similar to those described in British Patent Nos. 1,326,889, 1,354,313, and 1,410,846, U.S. Pat. Nos. 3,336,135, 4,268,593, 4,558,131, and 4,584,265, Japanese Patent Application Publication (JP-B) Nos. S51-1420 and S52-6523, and JP-A Nos. S58-114036, S59-5246, S61-73152, S61-86750, S61-90155, S61-90156, and S61-172246.

<Near-Infrared Absorbing Compound Obtained by Oxidation of Compound Represented by Formula (II)>

The near-infrared absorbing material according to the invention contains at least one near-infrared absorbing compound obtained by oxidation of a compound represented by the following Formula (II).

First, the compound represented by Formula (II) will be described.

Formula (II)

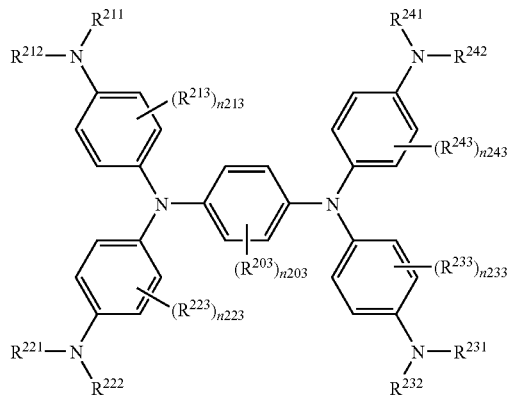

In Formula (II), $R^{211}$, $R^{212}$, $R^{221}$, $R^{222}$, $R^{231}$, $R^{232}$, $R^{241}$ and $R^{242}$ independently represent a hydrogen atom or an aliphatic group or an aromatic group; $R^{203}$, $R^{213}$, $R^{223}$, $R^{233}$ and $R^{243}$ independently represent a substituent; and $n_{203}$, $n_{213}$, $n_{223}$, $n_{233}$ and $n_{243}$ independently represent an integer of 0 to 4.

Each of $R^{211}$, $R^{212}$, $R^{221}$, $R^{222}$, $R^{231}$, $R^{232}$, $R^{241}$ and $R^{242}$ is preferably a hydrogen atom, an alkyl group, an alkenyl group, an alkynyl group, or an aryl group, more preferably a hydrogen atom, an alkyl group having 1 to 20 carbon atoms, an alkenyl group having 2 to 20 carbon atoms, an alkynyl group having 2 to 20 carbon atoms, or an aryl group having 6 to 20 carbon atoms, still more preferably an alkyl group having 1 to 10 carbon atoms, an alkenyl group having 2 to 10 carbon atoms, or an aryl group having 6 to 10 carbon atoms, still more preferably an alkyl group having 1 to 8 carbon atoms, or an aryl group having 6 to 8 carbon atoms, and most preferably an alkyl group having 2 to 6 carbon atoms. In addition, all of $R^{211}$, $R^{212}$, $R^{221}$, $R^{222}$, $R^{231}$, $R^{232}$, $R^{241}$ and $R^{142}$ are preferably the same.

Each of $R^{203}$, $R^{213}$, $R^{223}$, $R^{233}$ and $R^{243}$ is preferably a halogen atom, an alkyl group, an alkenyl group, an alkynyl group, an aryl group, a cyano group, a hydroxyl group, a carboxyl group, an alkoxy group, an aryloxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, a sulfa group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group, more preferably a halogen atom, an alkyl group, an alkenyl group, an aryl group, a cyano group, a hydroxyl group, a carboxyl group, an alkoxy group, an aryloxy group, a silyloxy group, an amino group, an alkylthio group, an arylthio group, an imido group, or a silyl group, still more preferably a halogen atom, an alkyl group, an aryl group, an alkoxy group, an aryloxy group, a silyloxy group, or an amino group, and most preferably an alkyl group. In addition, all of $R^{213}$, $R^{223}$, $R^{233}$ and $R^{243}$ are preferably the same.

Each of $n_{203}$, $n_{213}$, $n_{223}$, $n_{333}$ and $n_{243}$ is preferably 0 to 3, more preferably 0 to 2, still more preferably 0 or 1, and most preferably 0.

Hereinafter, typical examples of the compounds represented by Formula (II) recited in the invention will be shown below, but the invention is not limited by them.

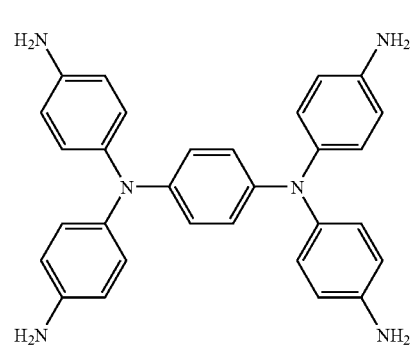
(II-1)

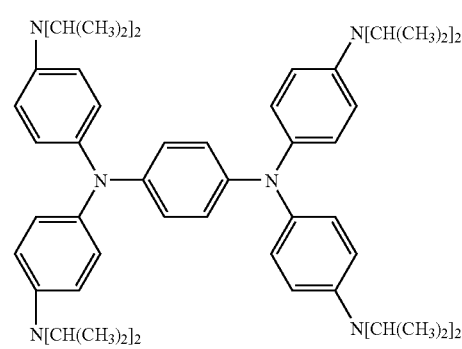
(II-2)

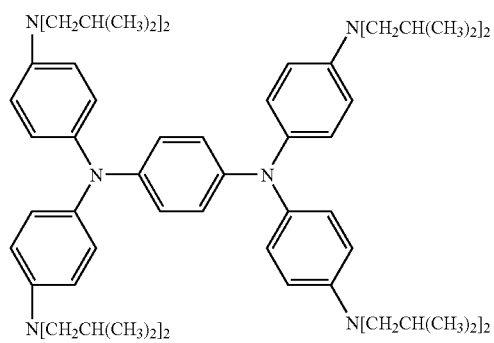
(II-3)
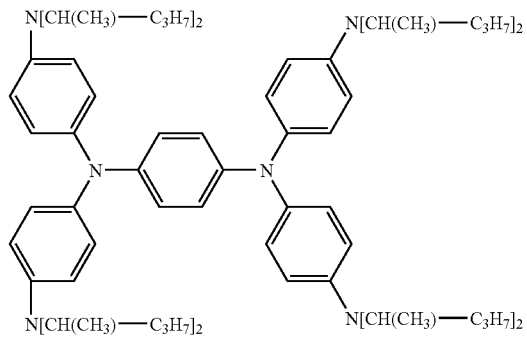
(II-7)
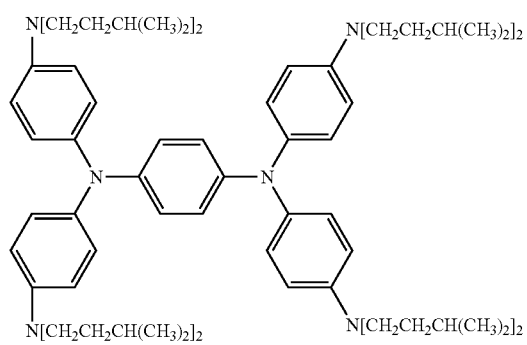
(II-4)
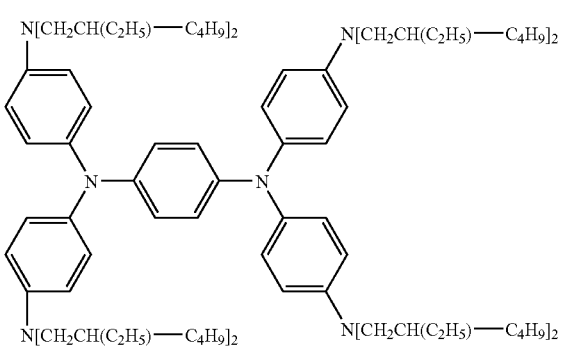
(II-8)
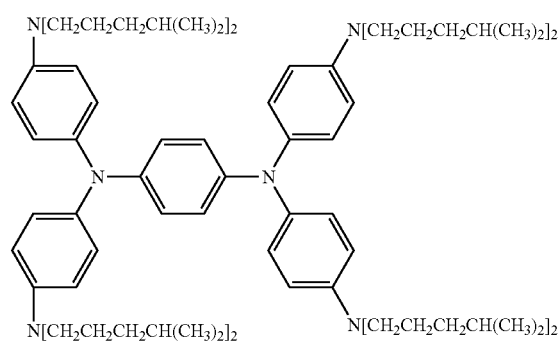
(II-5)
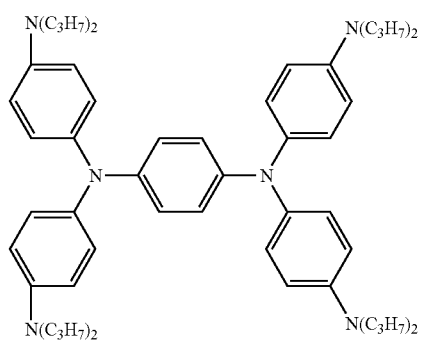
(II-9)
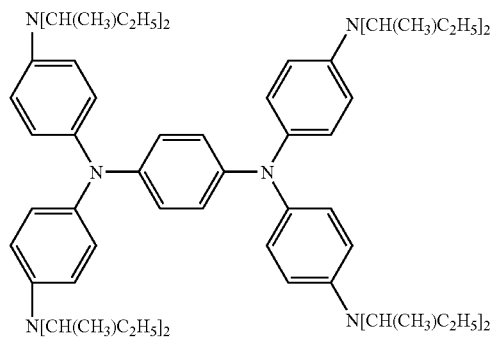
(II-6)
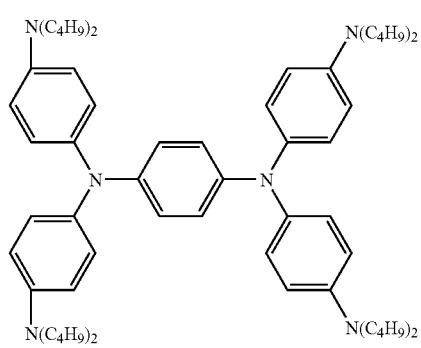
(II-10)

-continued
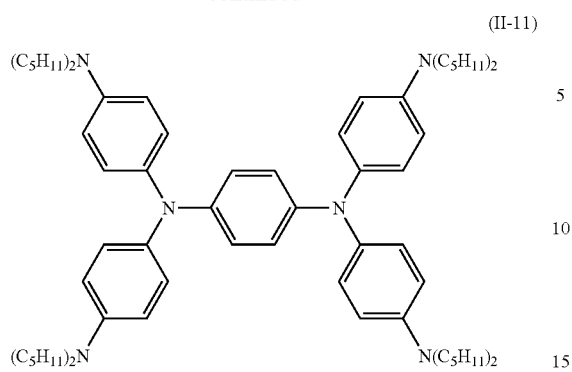
(II-11)
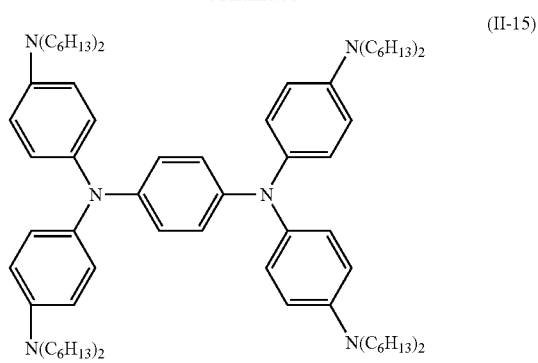
(II-15)
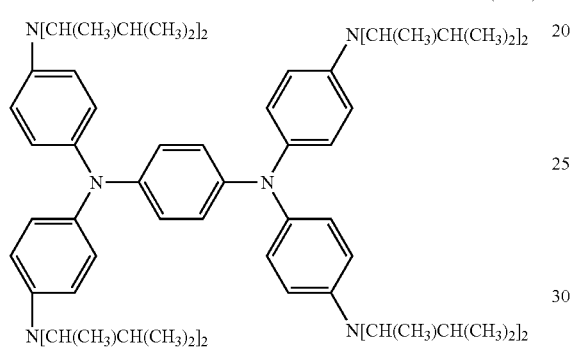
(II-12)
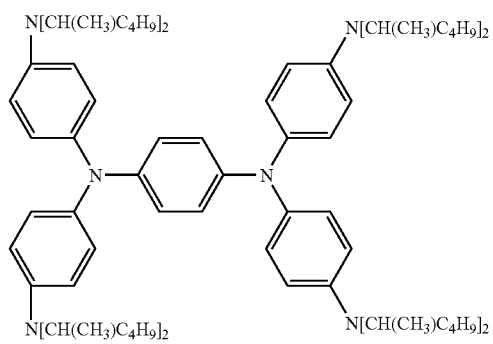
(II-16)
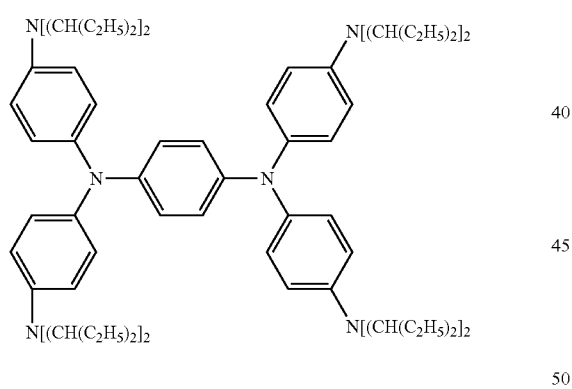
(II-13)
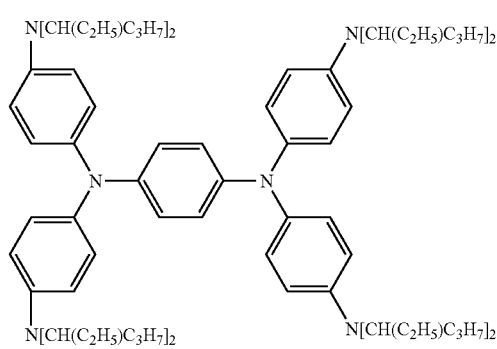
(II-17)
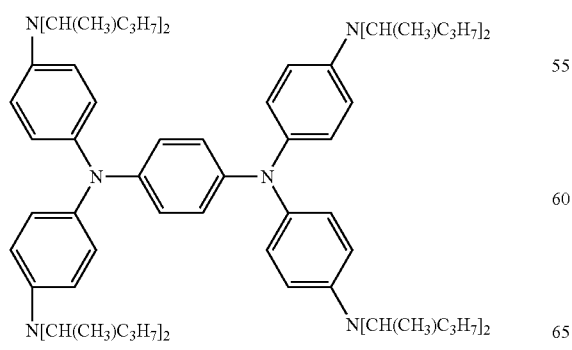
(II-14)
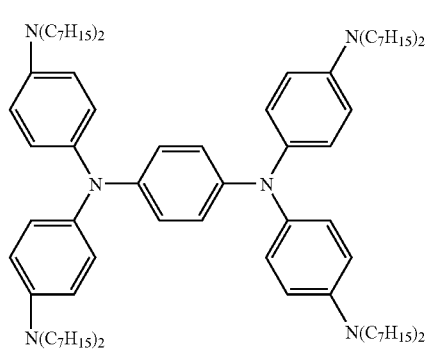
(II-18)

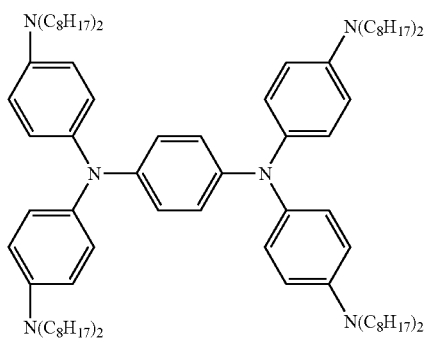
(II-19)
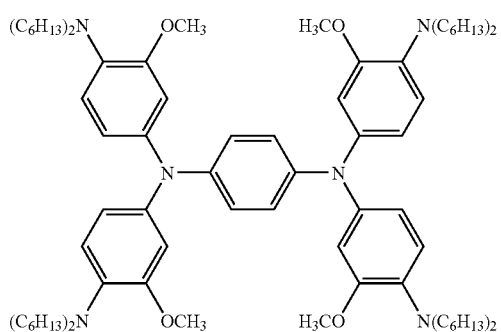
(II-23)
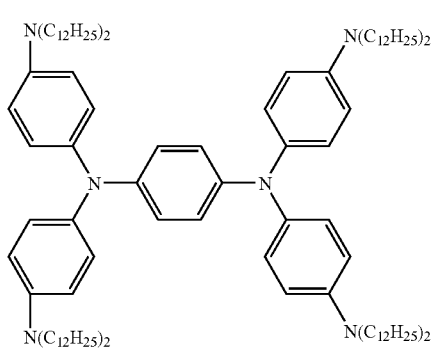
(II-20)
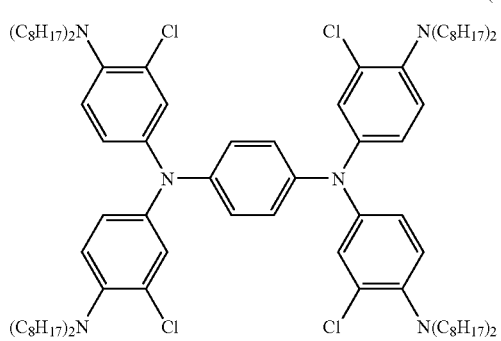
(II-24)
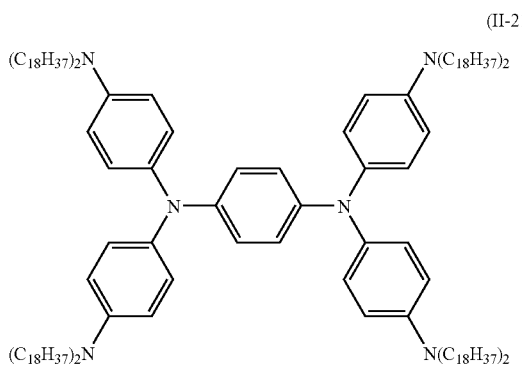
(II-21)
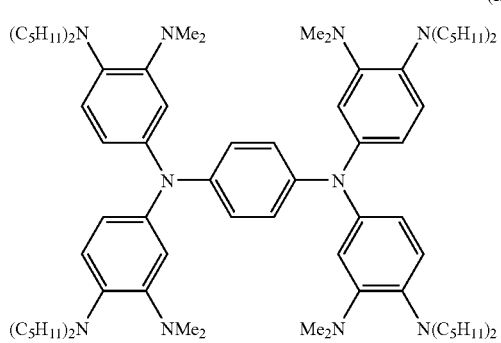
(II-25)
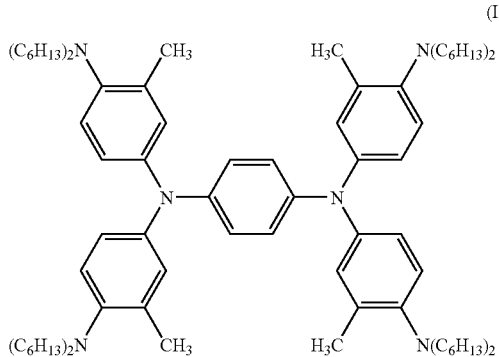
(II-22)
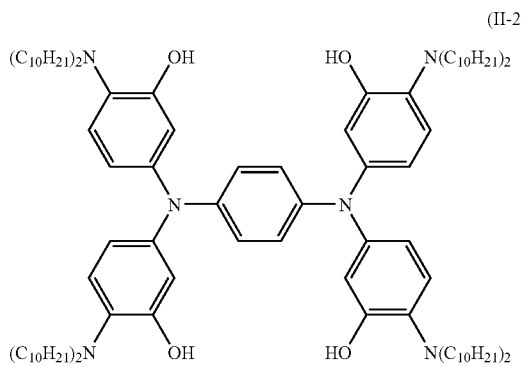
(II-26)

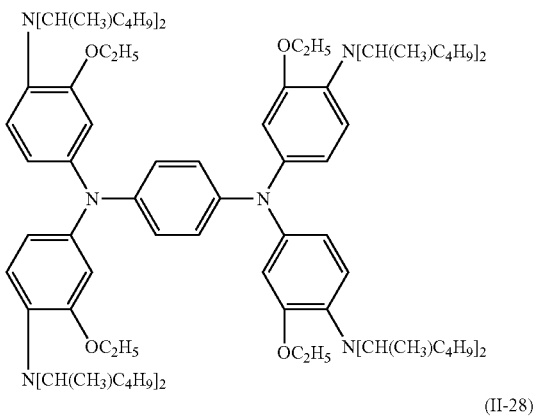
(II-27)

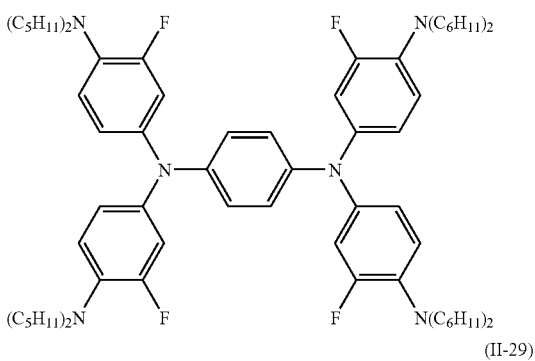
(II-28)

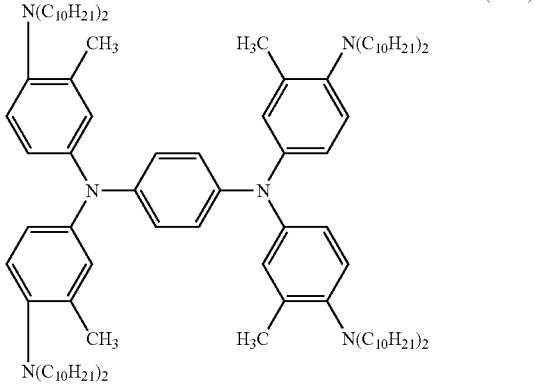
(II-29)

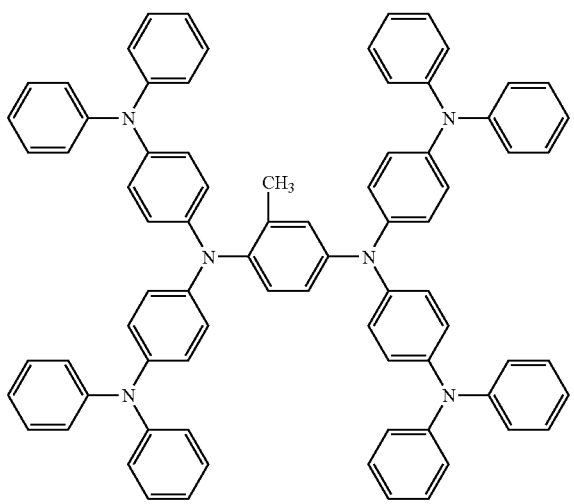
(II-30)

The compounds represented by Formula (II) can be prepared, for example, according to methods described in Journal of Dispersion Science and Technology, vol. 23, p. 555, published in 2002.

The near-infrared absorbing material according to the invention contains at least one near-infrared absorbing compound obtained by oxidation of a compound represented by Formula (II), preferably contains an aminium or diimmonium colorant compound obtained by oxidation of a compound represented by Formula (II), and more preferably a compound represented by Formula (XII-1) described later.

The aminium or diimmonium colorant obtained by oxidation of a compound represented by Formula (II) can be produced easily according to known methods or methods similar to the known methods. For example, a method of oxidizing a compound represented by Formula (II) with $Cu^{2+}$ (e.g., JP-B No. S59-40825 and JP-A No. S63-51462), a method of oxidizing the compound with $Fe^{3+}$ (e.g., JP-A Nos. H02-311447 and H11-315054), a method of oxidizing the compound with a solid catalyst (e.g., JP-A No. H05-98243), a method of oxidizing the compound with a peroxobisulfate (e.g., JP-A No. 2003-55643), a method of oxidizing the compound with silver hexafluoroantimonate (e.g., Journal of Dispersion Science and Technology, vol. 23, p. 555, published in 2002 and a method of electrically oxidizing the compound (e.g., JP-A No. S61-246391) are known.

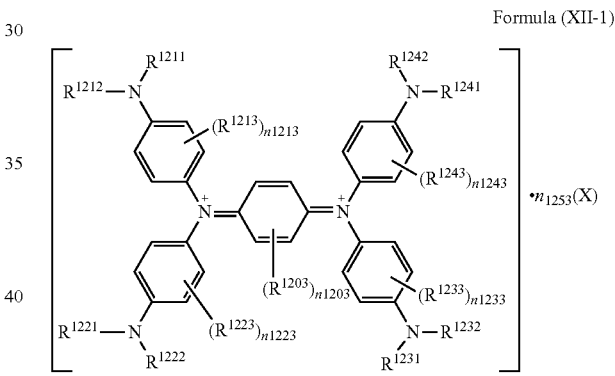

Formula (XII-1)

In Formula (XII-1), $R^{1211}$, $R^{1212}$, $R^{1221}$, $R^{1222}$, $R^{1231}$, $R^{1232}$, $R^{1241}$ and $R^{1242}$ independently represent a hydrogen atom or an aliphatic group or an aromatic group, $R^{1203}$, $R^{1213}$, $R^{1223}$, $R^{1233}$ and $R^{1243}$ independently represent a substituent, $n_{1203}$, $n_{1213}$, $n_{1223}$, $n_{1233}$ and $n_{1243}$ independently represent an integer of 0 to 4, X represents a monovalent or bivalent anion, $n_{1253}$ is 1 or 2, and the product of the valency of X and $n_{1253}$ is 2.

Each of $R^{1211}$, $R^{1212}$, $R^{1221}$, $R^{1222}$, $R^{1231}$, $R^{1232}$, $R^{1241}$ and $R^{1242}$ has the same meaning as $R^{211}$, and typical examples thereof are the same as those for $R^{211}$. In addition, all of $R^{1211}$, $R^{1212}$, $R^{1221}$, $R^{1222}$, $R^{1231}$, $R^{1232}$, $R^{1241}$ and $R^{1242}$ are preferably the same.

Each of $R^{1203}$, $R^{1213}$, $R^{1223}$, $R^{1233}$ and $R^{1243}$ has the same meaning as $R^{203}$, and typical examples thereof are also the same as those for $R^{203}$. In addition, all of $R^{1213}$, $R^{1223}$, $R^{1233}$ and $R^{1243}$ are preferably the same. Each of $n_{1203}$, $n_{1213}$, $n_{1223}$, $n_{1233}$ and $n_{1243}$ has the same meaning as $n_{203}$, and the preferred range examples thereof are also the same as that for $n_{203}$.

X represents a monovalent or bivalent anion. X is preferably a perchloric ion, a carboxylic ion, a sulfonic ion, a hexafluorophosphoric ion, a tetrafluoroboric ion or a hexafluoroantimonic ion, more preferably a perchloric ion, a sulfonic ion, a hexafluorophosphoric ion, a tetrafluoroboric ion or a hexafluoroantimonic ion, still more preferably a sulfonic ion, a hexafluorophosphoric ion, a tetrafluoroboric ion or a hexafluoroantimonic ion, and still more preferably a hexafluorophosphoric ion, a tetrafluoroboric ion or a hexafluoroantimonic ion.

Hereinafter, typical examples of the compounds represented by Formula (XII-1) according to the invention are shown below, but the invention is not limited by them.

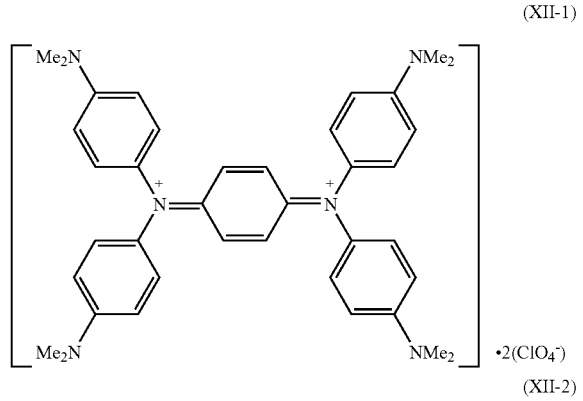

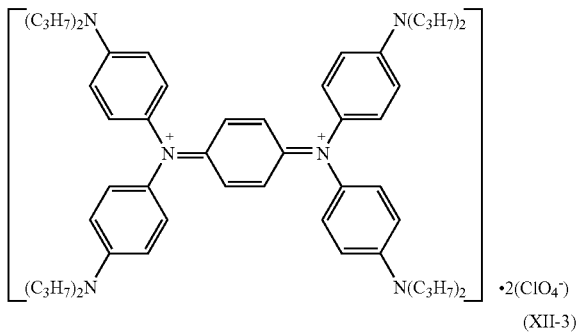

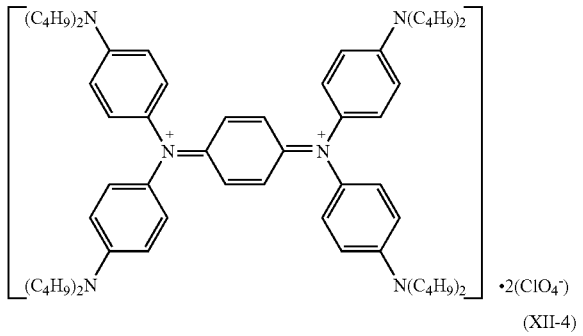

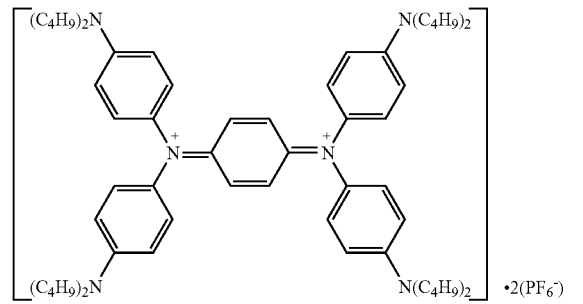

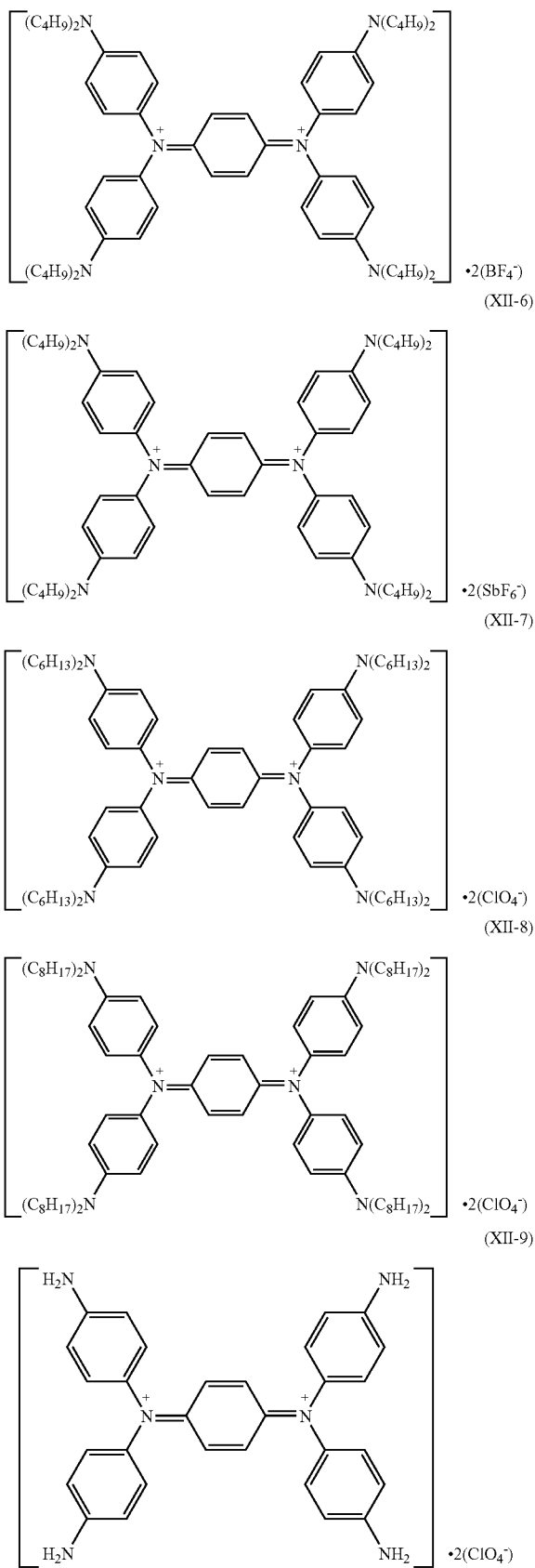

(XII-10)
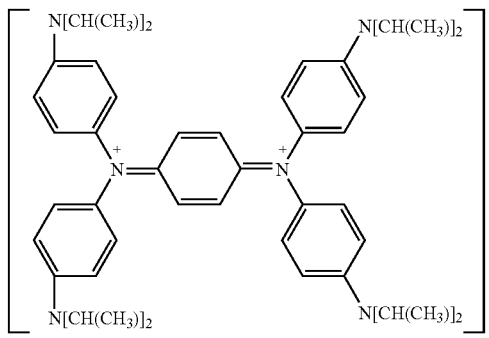
•2(ClO4⁻)
(XII-11)
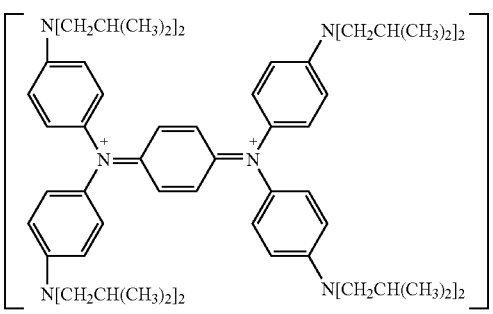
•2(ClO4⁻)
(XII-12)
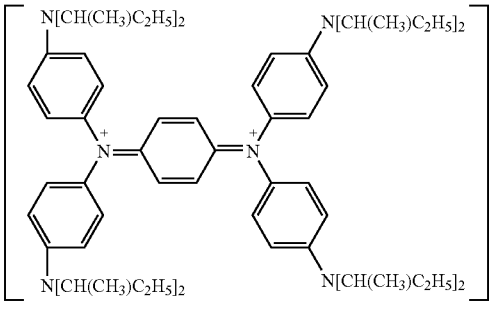
•2(ClO4⁻)
(XII-13)
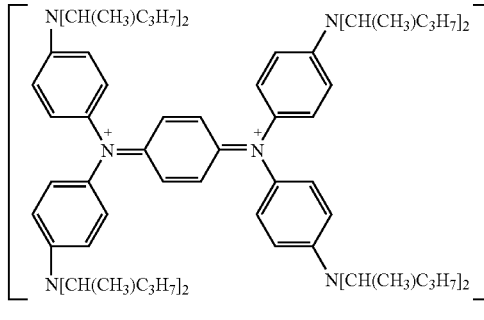
•2(BF4⁻)
(XII-14)
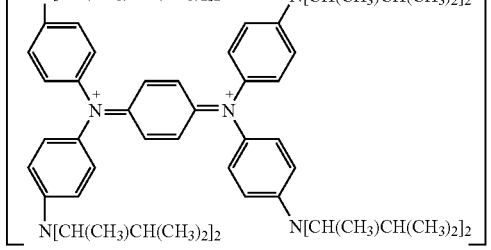
•2(ClO4⁻)
(XII-15)
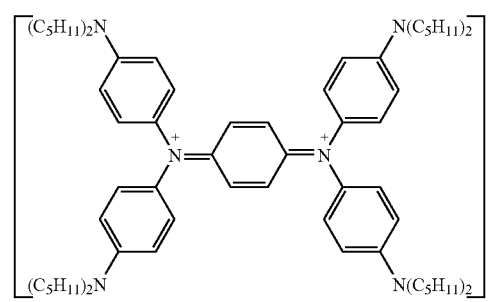
•2(ClO4⁻)
(XII-16)
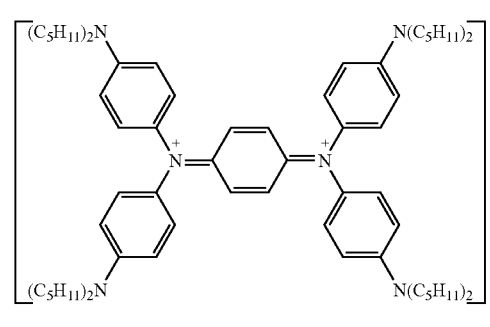
•2(SbF6⁻)
(XII-17)
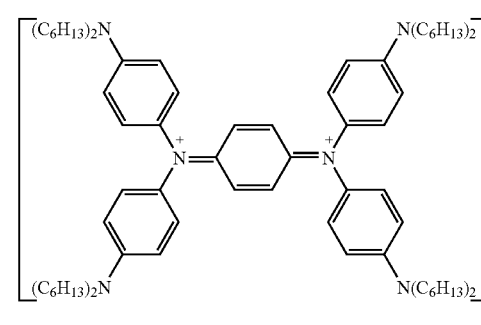
•2(BF4⁻)
(XII-18)
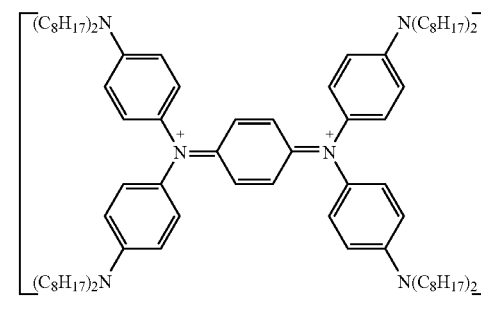
•2(PF6⁻)
(XII-19)
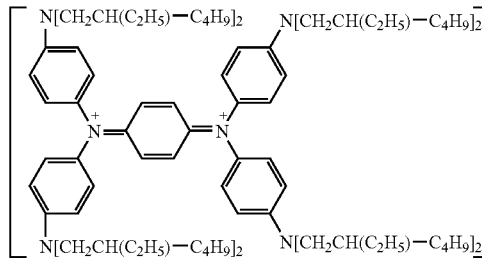
•2(ClO4⁻)

-continued
(XII-20)
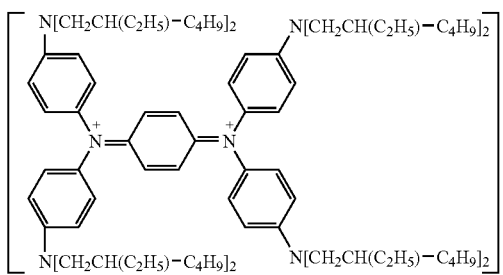
(XII-21)
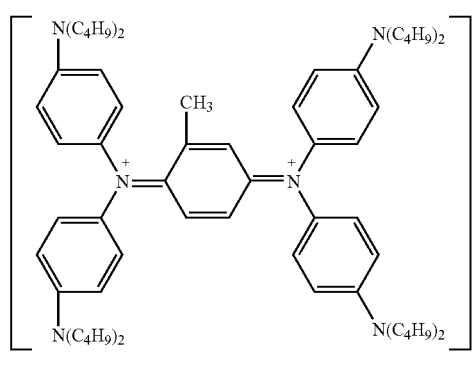
(XII-22)
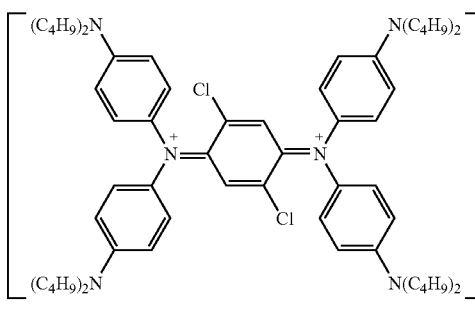
(XII-23)
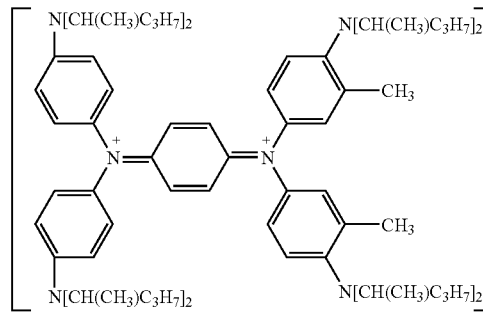
(XII-24)
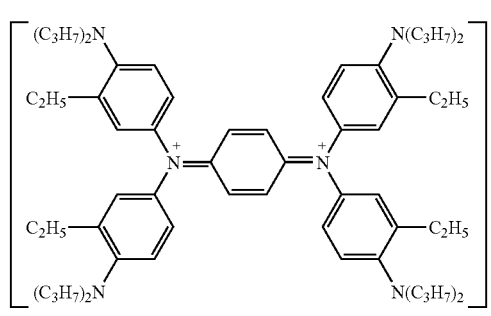
-continued
(XII-25)
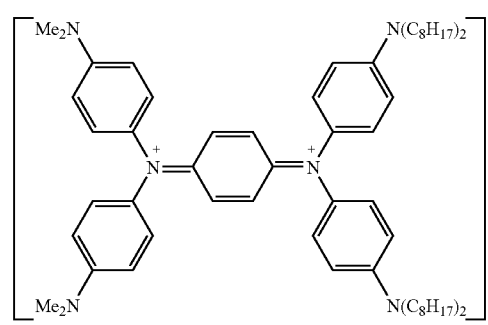
(XII-26)
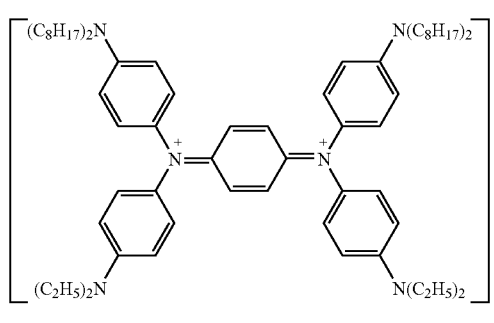
(XII-27)
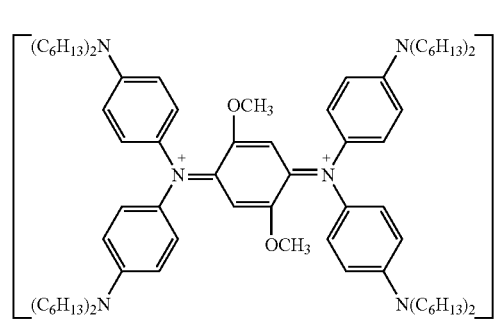
(XII-28)
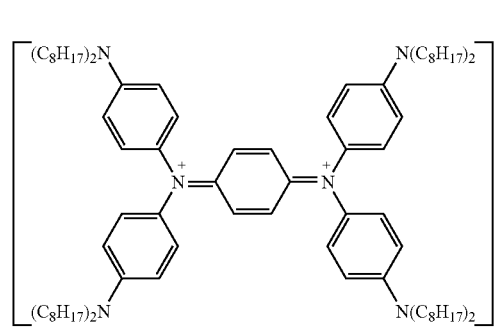
(XII-29)
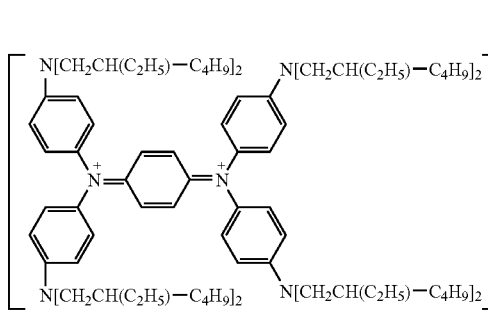

-continued (XII-30)

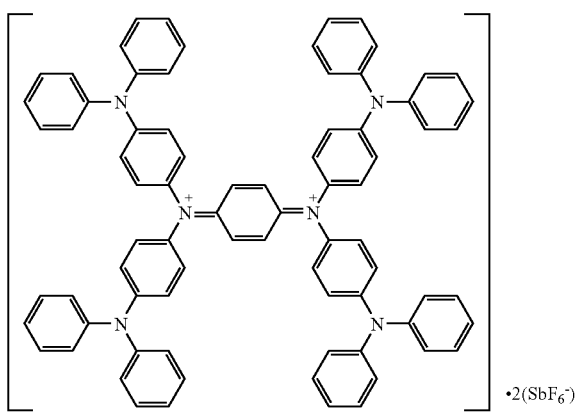

·2(SbF$_6^-$)

These compounds can be prepared easily according the synthesis methods described above.

<Ultraviolet Absorbent or Fluorescent Brightener>

The near-infrared absorbing material according to the invention preferably contains at least one of ultraviolet absorbents and fluorescent brighteners serving as the component 3).

The ultraviolet absorbent and the fluorescent brightener serving as the component 3) above will be described below.

As for spectroscopic absorption properties, the maximum spectroscopic absorption wavelength when in solution of the compound 3) is preferably 470 nm or less in the range of 270 to 1,600 nm, more preferably 430 nm or less, still more preferably 410 nm or less, and most preferably 380 nm or less.

As for chemical formula, the ultraviolet absorbent or fluorescent brightener is preferably a compound represented by one of the following Formulae (III-1) to (III-9).

Hereinafter, the compounds represented by Formulae (III-1) to (III-9) will be described.

Formula (III-1)

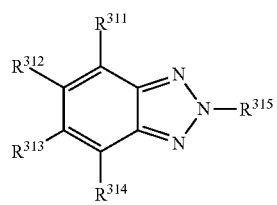

Formula (III-2)

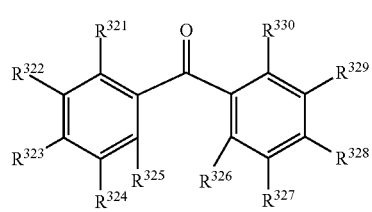

Formula (III-3)

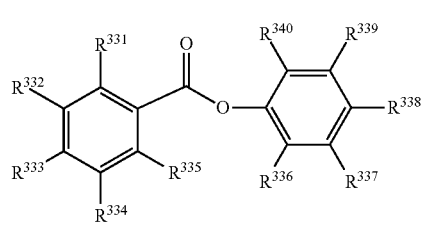

Formula (III-4)

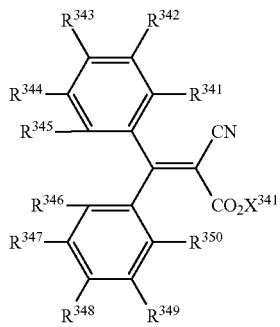

Formula (III-5)

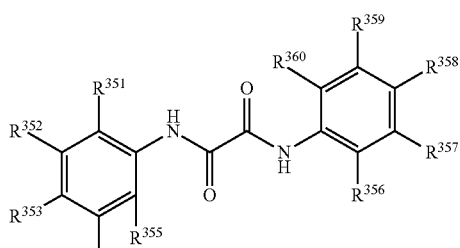

Formula (III-6)

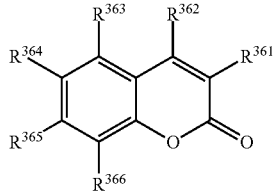

Formula (III-7)

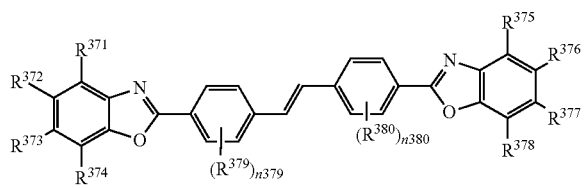

Formula (III-8)

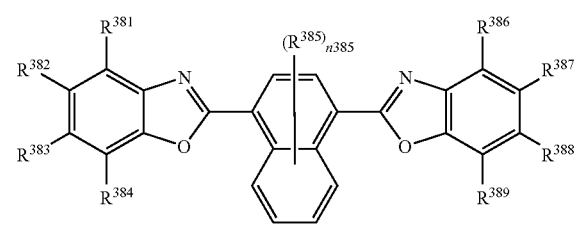

Formula (III-9)

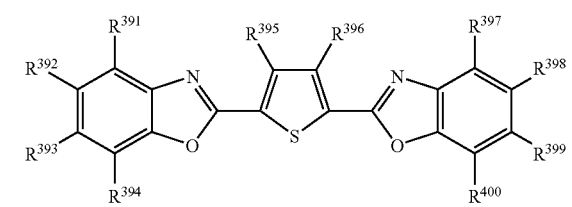

In the formulae, $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ independently represent a hydrogen atom or a substituent. $R^{315}$ represents a hydrogen atom, an aliphatic group, an aromatic group or a heterocyclic group having a carbon atom that is bonded to the nitrogen atom. $R^{379}$, $R^{380}$ and $R^{385}$ independently represent a substituent. $X^{341}$ represents a hydrogen atom, an aliphatic group, an aromatic group or a heterocyclic group having a carbon atom that is bonded to the carbonyloxy group. $n_{379}$ and $n_{380}$ independently represent an integer of 0 to 4. When $n_{379}$ and/or $n_{380}$ is 2 or more, a plurality of groups $R^{379}$ and/or $R^{380}$ may be the same as or different from each other. $n_{385}$ represents an integer of 0 to 6. When $n_{385}$ is 2 or more, a plurality of groups $R^{385}$ may be the same as or different from each other.

Neighboring groups of them may be bonded to each other to form at least one ring.

Examples of the substituents represented by $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ include those of the substituent(s) of the substituted alkyl group, the substituted alkenyl group and the substituted alkynyl groups and those of the substituent(s) of the substituted alkyl moiety(s) of the aforementioned substituted aralkyl group.

Each of $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ preferably represents a hydrogen atom, a halogen atom, an alkyl group, an alkenyl group, an alkynyl group, an aryl group, a cyano group, a hydroxyl group, a carboxyl group, an alkoxy group, an aryloxy group, a silyloxy group, an acyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, a sulfa group, an alkyl- or aryl-sulfonyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group.

Each of $R^{311}$ to $R^{314}$ more preferably represents a hydrogen atom, a halogen atom, an alkyl group, analkenyl group, an aryl group, a cyano group, a hydroxyl group, a carboxyl group, an alkoxy group, an aryloxy group, a silyloxy group, an amino group, an alkylthio group, an arylthio group, an imido group, or a silyl group, still more preferably a hydrogen atom, a halogen atom, an alkyl group, an aryl group, an alkoxy group, an aryloxy group, a silyloxy group, or an amino group, still more preferably a hydrogen atom, a halogen atom, or an alkyl group, and most preferably a hydrogen atom or a halogen atom.

$R^{315}$ preferably represents a hydrogen atom, an alkyl group, an alkenyl group, an alkynyl group, or an aryl group, more preferably a hydrogen atom, an alkyl group having 1 to 30 carbon atoms, an alkenyl group having 2 to 30 carbon atoms, an alkynyl group having 2 to 30 carbon atoms, or an aryl group having 6 to 30 carbon atoms, still more preferably a hydrogen atom, an alkyl group having 1 to 25 carbon atoms, an alkenyl group having 2 to 25 carbon atoms, or an aryl group having 6 to 25 carbon atoms, still more preferably an alkyl group having 1 to 22 carbon atoms or an aryl group having 6 to 22 carbon atoms, still more preferably an aryl group having 6 to 20 carbon atoms, and most preferably an ortho-hydroxyphenyl group having 6 to 20 carbon atoms.

Each of $R^{321}$ to $R^{330}$ preferably represents a hydrogen atom, a halogen atom, an alkyl group, an alkenyl group, an aryl group, a cyano group, a hydroxyl group, a carboxyl group, an alkoxy group, an aryloxy group, a silyloxy group, an acyloxy group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, a sulfa group, an alkyl- or aryl-sulfonyl group, an acyl group, an aryloxycarbonyl group, an alkoxycarbonyl group, a carbamoyl group, an imido group, or a silyl group, more preferably a hydrogen atom, a halogen atom, an alkyl group, an aryl group, a hydroxyl group, an alkoxy group, an aryloxy group, an acyloxy group, an acylamino group, an alkyl- or aryl-sulfonylamino group, a sulfamoyl group, an acyl group, an aryloxycarbonyl group, an alkoxycarbonyl group, or a carbamoyl group, still more preferably a hydrogen atom, a halogen atom, an alkyl group, a hydroxyl group, an alkoxy group, an acyloxy group, an acylamino group, an acyl group, an alkoxycarbonyl group, or a carbamoyl group, and still more preferably a hydrogen atom, a halogen atom, an alkyl group, a hydroxyl group, an alkoxy group, an acylamino group, or an alkoxycarbonyl group. $R^{321}$ is most preferably a hydroxy group.

Each of $R^{331}$ to $R^{340}$ preferably represents a hydrogen atom, a halogen atom, an alkyl group, an alkenyl group, an aryl group, a cyano group, a hydroxyl group, a carboxyl group, an alkoxy group, an aryloxy group, a silyloxy group, an acyloxy group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, a sulfo group, an alkyl- or aryl-sulfonyl group, an acyl group, an aryloxycarbonyl group, an alkoxycarbonyl group, a carbamoyl group, an imido group, or a silyl group, more preferably a hydrogen atom, a halogen atom, an alkyl group, an aryl group, a hydroxyl group, an alkoxy group, an aryloxy group, an acyloxy group, an acylamino group, an alkyl- or aryl-sulfonylamino group, a sulfamoyl group, an acyl group, an aryloxycarbonyl group, an alkoxycarbonyl group, or a carbamoyl group, still more preferably a hydrogen atom, a halogen atom, an alkyl group, a hydroxyl group, an alkoxy group, an acyloxy group, an acylamino group, an acyl group, an alkoxycarbonyl group, or a carbamoyl group, and still more preferably a hydrogen atom, a halogen atom, an alkyl group, a hydroxyl group, an alkoxy group, an acylamino group, or an alkoxycarbonyl group. $R^{331}$ is most preferably a hydroxy group.

Each of $R^{341}$ to $R^{350}$ preferably represents a hydrogen atom, a halogen atom, an alkyl group, an aryl group, a hydroxyl group, an alkoxy group, an aryloxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, an alkylthio group, an arylthio group, a sulfamoyl group, an acyl group, an aryloxycarbonyl group, an alkoxycarbonyl group, a carbamoyl group, or a silyl group, more preferably a hydrogen atom, a halogen atom, an alkyl group, an aryl group, an alkoxy group, an aryloxy group, an amino group, an acylamino group, an alkylthio group, or an arylthio group, still more preferably a hydrogen atom, a halogen atom, an alkyl group, an alkoxy group, an amino group, or an acylamino group, and most preferably a hydrogen atom, an alkoxy group or an amino group.

$X^{341}$ preferably represents a hydrogen atom, an alkyl group, an alkenyl group, an alkynyl group, or an aryl group, still more preferably a hydrogen atom, an alkyl group having 1 to 30 carbon atoms, an alkenyl group having 2 to 30 carbon atoms, an alkynyl group having 2 to 30 carbon atoms, or an aryl group having 6 to 30 carbon atoms, still more preferably a hydrogen atom, an alkyl group having 1 to 25 carbon atoms, an alkenyl group having 2 to 25 carbon atoms, or an aryl group having 6 to 25 carbon atoms, still more preferably an alkyl group having 1 to 22 carbon atoms or an aryl group having 6 to 22 carbon atoms, and most preferably an alkyl group having 1 to 18 carbon atoms.

Each of $R^{351}$ to $R^{360}$ preferably represents a hydrogen atom, a halogen atom, an alkyl group, an aryl group, a cyano group, a hydroxyl group, an alkoxy group, an aryloxy group, an acyloxy group, an amino group, an acylamino group, a mercapto group, an alkylthio group, an arylthio group, a sulfamoyl group, an alkyl- or aryl-sulfonyl group, an alkyl- or aryl-sulfonyl group, an acyl group, an aryloxycarbonyl group, an alkoxycarbonyl group, or a silyl group, and more preferably a hydrogen atom, a halogen atom, an alkyl group, an aryl group, a hydroxyl group, an alkoxy group, an acyloxy group, an amino group, an acylamino group, an arylthio group, an acyl group, an aryloxycarbonyl group, or an alkoxycarbonyl group. $R^{351}$ is most preferably a hydroxy group.

Each of $R^{361}$ to $R^{366}$ preferably represents a hydrogen atom, a halogen atom, an alkyl group, an aryl group, a heterocyclic group, a cyano group, a hydroxyl group, an alkoxy group, an aryloxy group, a silyloxy group, a heterocyclic oxy group, an alkoxycarbonyl group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, an acyl group, an aryloxycarbonyl group, an alkoxycarbonyl group, a carbamoyl group, or an imido group, more preferably a hydrogen atom, an alkyl group, aryl group, a heterocyclic group, an amino group, an acylamino group, an aminocarbonylamino group, an alkoxycarbonyl group, an alkoxycarbonylamino group, an aryloxycarbonylamino group, a sulfamoylamino group, or an alkyl- or aryl-sulfonylamino group, and still more preferably an alkyl group, an aryl group, a heterocyclic group, an alkoxycarbonyl group, or an acylamino group.

Each of $R^{362}$, $R^{363}$, $R^{364}$ and $R^{366}$ still more preferably represents a hydrogen atom, a halogen atom, an alkyl group, an aryl group, a heterocyclic group, a cyano group, a hydroxyl group, an alkoxy group, an aryloxy group, or a silyl group, still more preferably a hydrogen atom, a halogen atom or an alkyl group, and most preferably a hydrogen atom.

On the other hand, $R^{365}$ still more preferably represents a hydrogen atom, a halogen atom, an alkyl group, an aryl group, a heterocyclic group, a cyano group, a hydroxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, an alkylthio group, an arylthio group, a heterocyclic thio group, a sulfamoyl group, an acyl group, an aryloxycarbonyl group, an alkoxycarbonyl group, a carbamoyl group, an imido group, or a silyl group, still more preferably a hydrogen atom, an alkyl group, an aryl group, a heterocyclic group, an amino group, an acylamino group, an aminocarbonylamino group, an alkoxycarbonylamino group, an aryloxycarbonylamino group, a sulfamoylamino group, or an alkyl- or aryl-sulfonylamino group, and still more preferably a heterocyclic group, an amino group, or an acylamino group.

Each of $R^{371}$, $R^{374}$, $R^{375}$ and $R^{378}$ preferably represents a hydrogen atom, a halogen atom, an alkyl group, an aryl group, a cyano group, a hydroxyl group, an alkoxy group, an amino group, or a mercapto group, more preferably a hydrogen atom, a halogen atom, an alkyl group, a hydroxyl group, an alkoxy group, or an amino group, and most preferably a hydrogen atom.

Each of $R^{372}$, $R^{373}$, $R^{376}$, and $R^{377}$ preferably represents a hydrogen atom, a halogen atom, an alkyl group, an aryl group, a hydroxyl group, an alkoxy group, an aryloxy group, an acyloxy group, an amino group, an acylamino group, a mercapto group, an alkylthio group, or a sulfamoyl group, more preferably a hydrogen atom, an alkyl group, an aryl group, an alkoxy group, an amino group, a mercapto group, or an alkylthio group, and still more preferably a hydrogen atom, an alkyl group, an aryl group, or an alkoxy group.

Each of $R^{379}$, $R^{380}$ and $R^{385}$ preferably represents a halogen atom, an alkyl group, an aryl group, a cyano group, a hydroxyl group, an alkoxy group, an aryloxy group, a silyloxy group, an amino group, an acylamino group, a mercapto group, an alkylthio group, an arylthio group, a heterocyclic thio group, or a silyl group, more preferably a halogen atom, an alkyl group, an aryl group, an alkoxy group, an aryloxy group, an alkylthio group, an arylthio group, or a heterocyclic thio group, and still more preferably a halogen atom, an alkyl group, an aryl group, or an alkoxy group.

Each of $n_{379}$ and $n_{380}$ is preferably 0 to 3, more preferably 0 to 2, still more preferably 0 or 1, and most preferably 0.

Typical examples of $R^{381}$, $R^{384}$, $R^{386}$ and $R^{389}$ are the same as those of $R^{371}$. In addition, typical examples of $R^{382}$, $R^{383}$, $R^{387}$ and $R^{388}$ are the same as those of $R^{372}$.

$R^{385}$ preferably represents a halogen atom, an alkyl group, an aryl group, a heterocyclic group, a cyano group, a hydroxyl group, an alkoxy group, an aryloxy group, a heterocyclic oxy group, a silyloxy group, an amino group, an acylamino group, a mercapto group, an alkylthio group, an arylthio group, a heterocyclic thio group, or a silyl group, more preferably a halogen atom, an alkyl group, an aryl group, an alkoxy group, an aryloxy group, an amino group, an alkylthio group, or an arylthio group, still more preferably a halogen atom, an alkyl group, an alkoxy group, an amino group, or an alkylthio group, and still more preferably a halogen atom or an alkyl group.

$n_{385}$ is preferably 0 to 4, more preferably 0 to 2, still more preferably 0 to 1, and most preferably 0.

Typical examples of $R^{391}$, $R^{394}$, $R^{397}$ and $R^{400}$ are the same as those of $R^{371}$. In addition, typical examples of $R^{392}$, $R^{393}$, $R^{398}$ and $R^{399}$ are the same as those of $R^{372}$.

Each of $R^{395}$ and $R^{396}$ preferably represents a hydrogen atom, a halogen atom, an alkyl group, an aryl group, a heterocyclic group, a cyano group, a nitro group, a hydroxyl group, an alkoxy group, an aryloxy group, a heterocyclic oxy group, a silyloxy group, an amino group, an acylamino group, a mercapto group, an alkylthio group, an arylthio group, a heterocyclic thio group, or a silyl group, more preferably a hydrogen atom, a halogen atom, an alkyl group, an aryl group, a heterocyclic group, a cyano group, a nitro group, an alkoxy group, an aryloxy group, a silyloxy group, an amino group, an acylamino group, an alkylthio group, or an arylthio group, still more preferably a hydrogen atom, a halogen atom, an alkyl group, a cyano group, an alkoxy group, or an amino group, and still more preferably a hydrogen atom or an alkyl group.

Among the compounds represented by Formulae (III-1) to (III-9), the compounds represented by Formulae (III-1), (III-2), (III-3), (III-4), (III-6), (III-7) and (III-9) are preferable: the compounds represented by Formulae (III-1), (III-2), (III-3), (III-6) and (III-7) are more preferable; the compounds represented by Formulae (III-1), (III-2), (III-3) and (III-6) are still more preferable; the compounds represented by Formulae (III-1), (III-2) and (III-6) are still more preferable; and the compounds represented by Formula (III-1) are the most preferable.

Exemplary compounds (III-1) to (III-165) serving as the component 3) are shown below, but the invention is not limited by them.

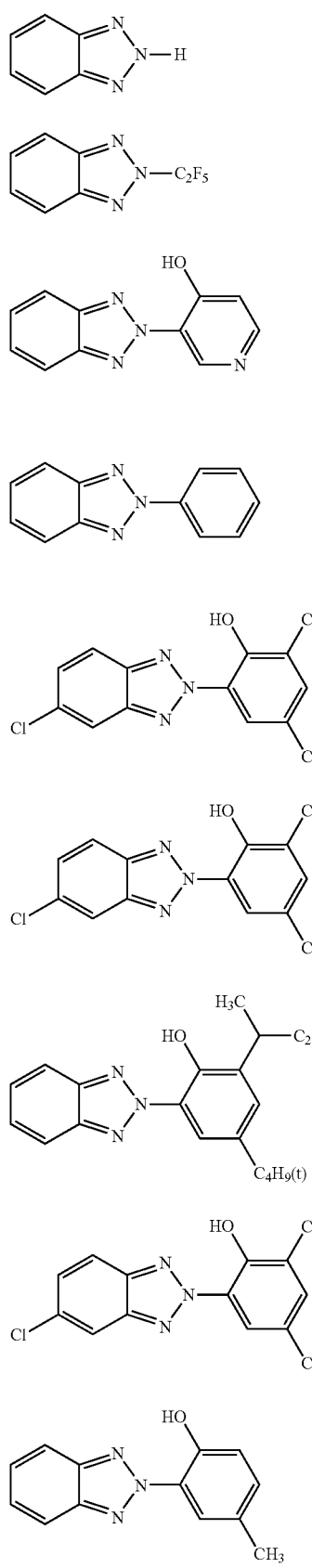

-continued
(III-19) 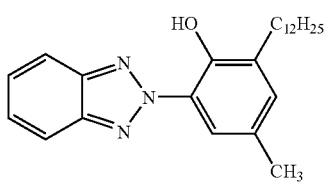
(III-20) 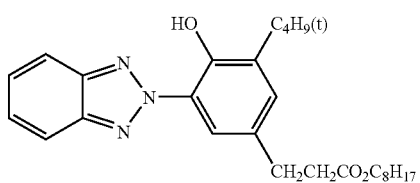
(III-21) 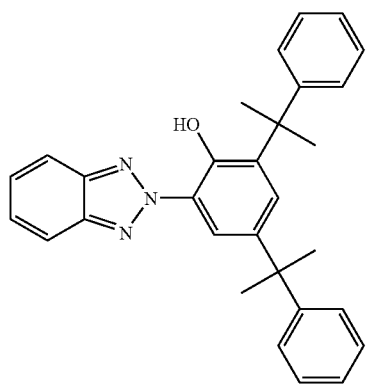
(III-22) 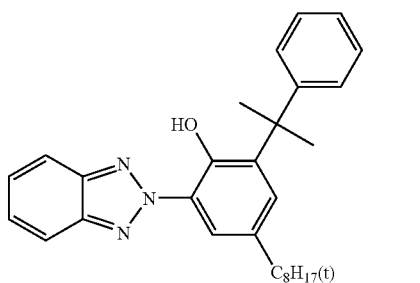
(III-23) 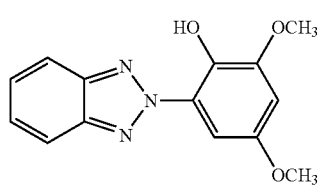
(III-24) 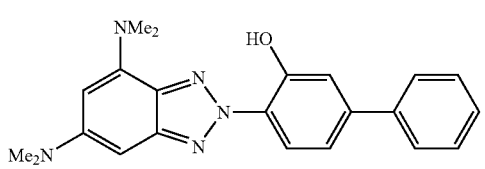
(III-25) 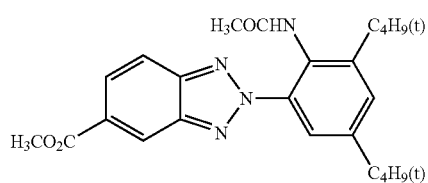
(III-26) 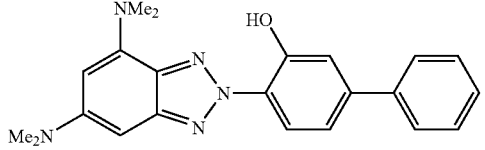
(III-27) 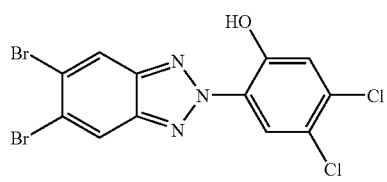
(III-28) 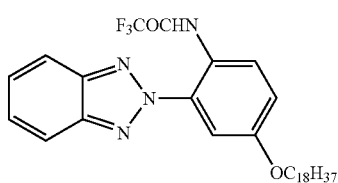
(III-29) 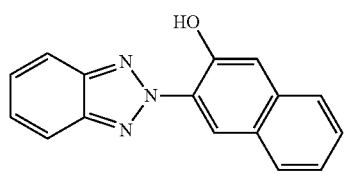
(III-30) 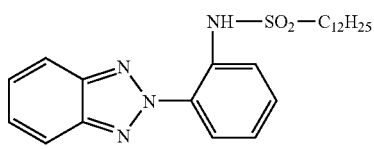
(III-31) 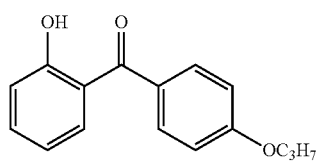
(III-32) 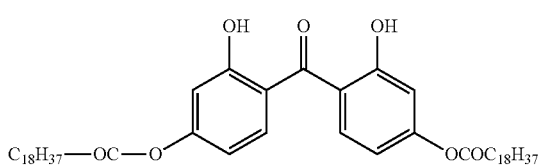

-continued
(III-33) 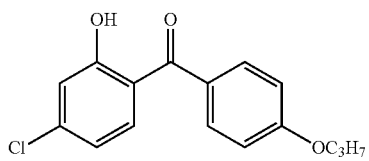
(III-34) 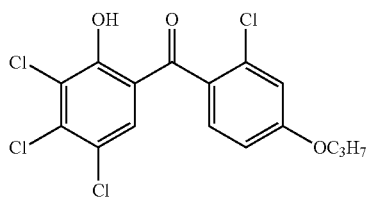
(III-35) 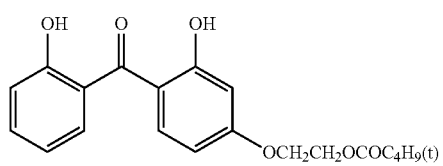
(III-36) 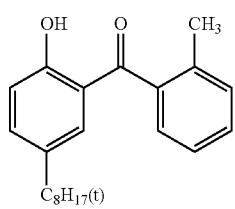
(III-37) 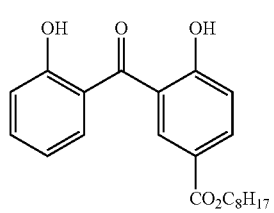
(III-38) 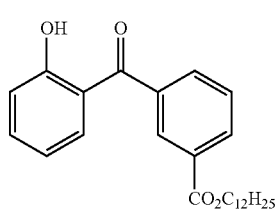
(III-39) 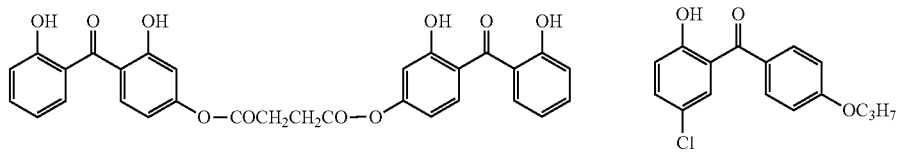
(III-40) 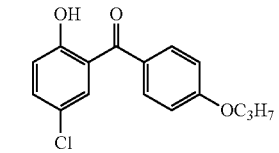
(III-41) 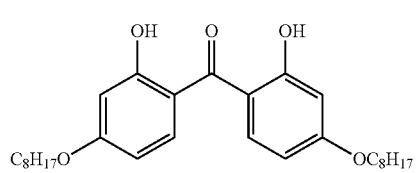
(III-42) 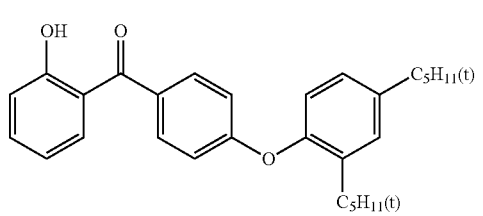
(III-43) 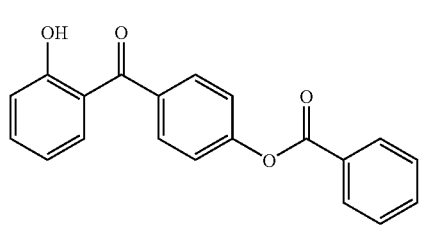
(III-44) 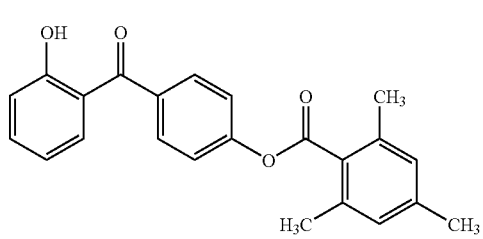
(III-45) 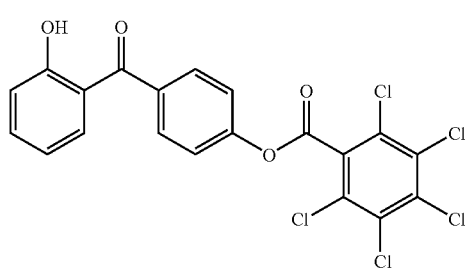
(III-46) 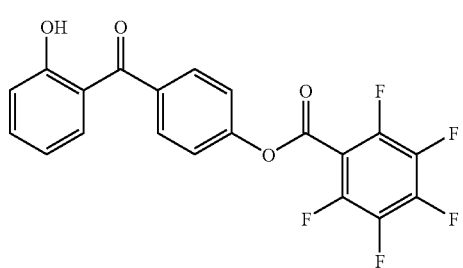

(III-47) 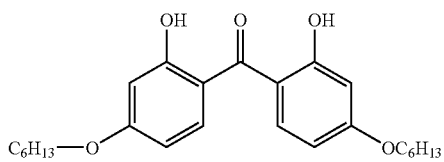
(III-48) 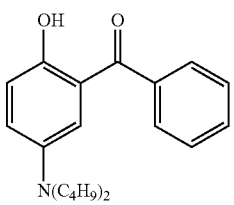
(III-49) 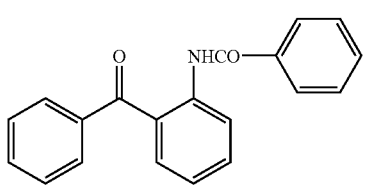
(III-50) 
(III-51) 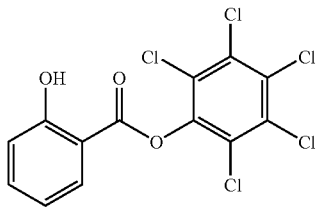
(III-52) 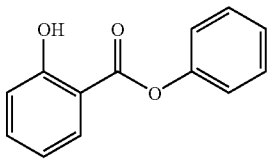
(III-53) 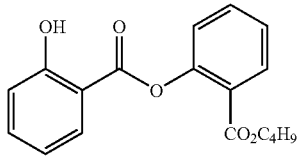
(III-54) 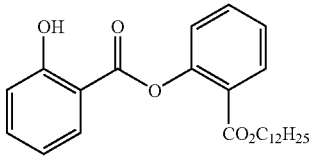
(III-55) 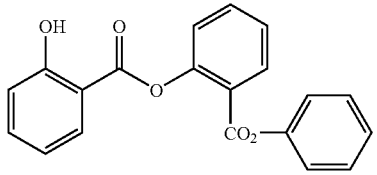
(III-56) 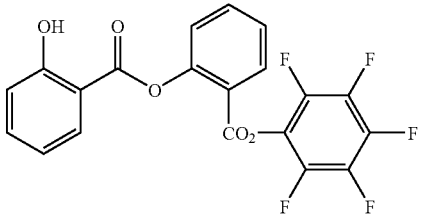
(III-57) 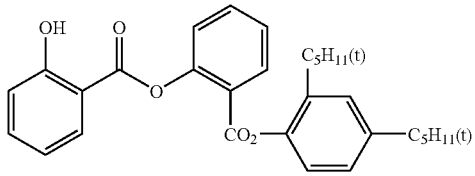
(III-58) 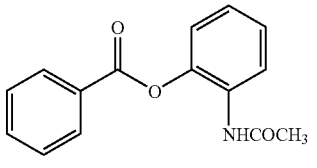
(III-59) 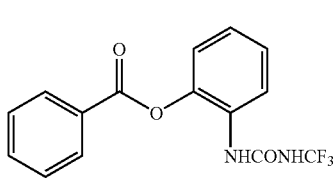
(III-60) 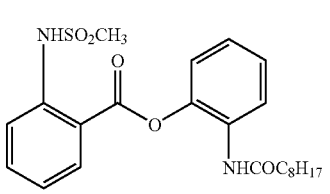

-continued
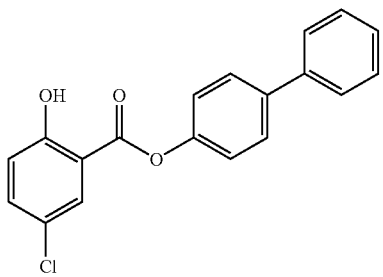 (III-61)
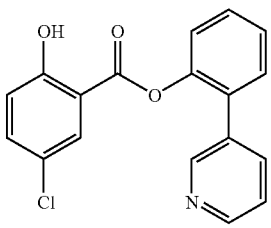 (III-62)
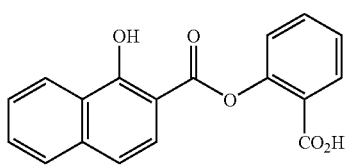 (III-63)
(III-64)
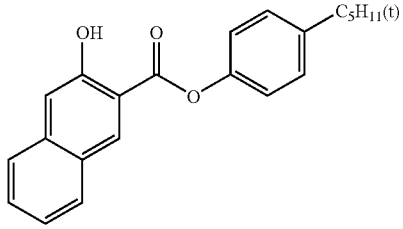 (III-65)
(III-66)
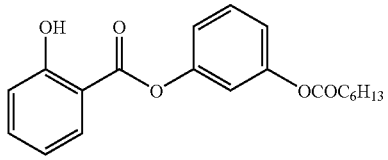 (III-67)
(III-68)
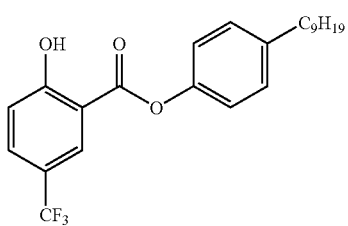 (III-69)
(III-70)
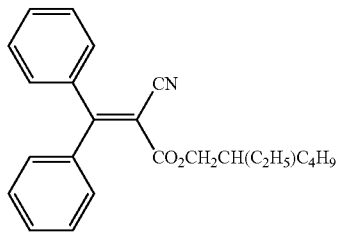 (III-71)
(III-72)

-continued
(III-73)
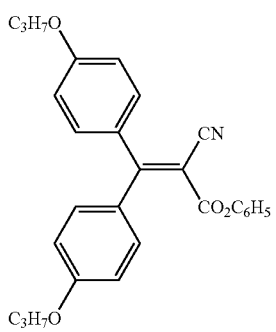
(III-74)
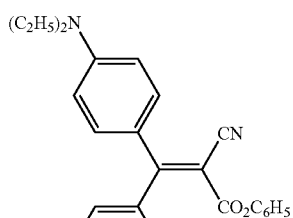
(III-75)
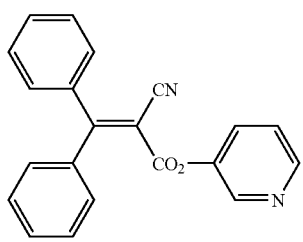
(III-76)
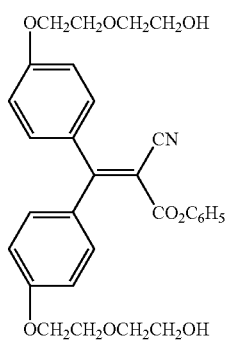
(III-77)
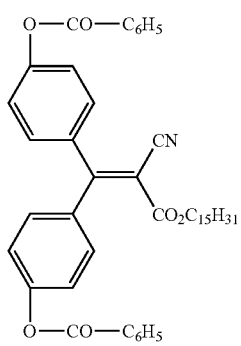
(III-78)
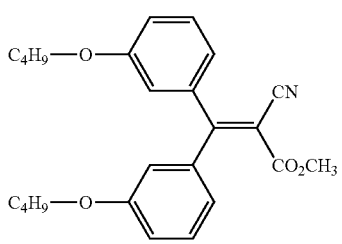
(III-79)
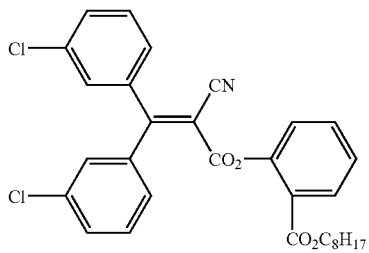
(III-80)
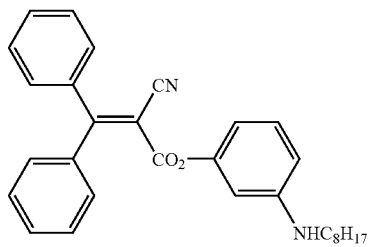
(III-81)
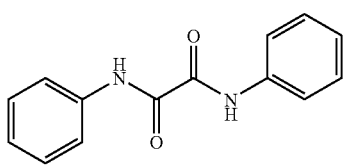
(III-82)
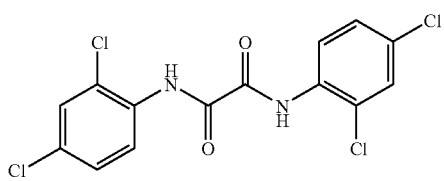
(III-83)
(III-84)
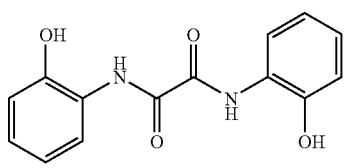

-continued
(III-85)
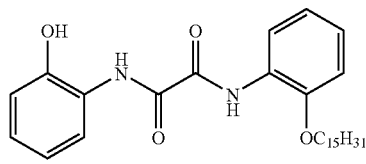
(III-86)
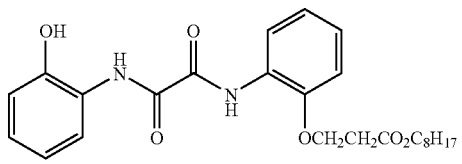
(III-87)
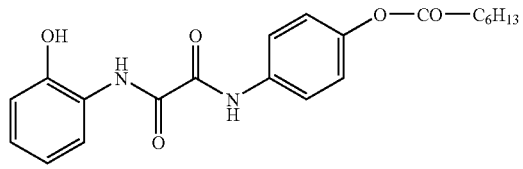
(III-88)
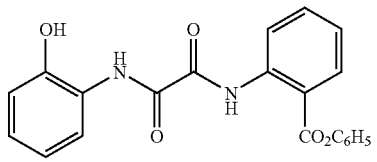
(III-89)
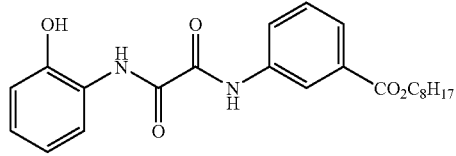
(III-90)
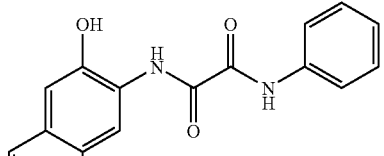
(III-91)
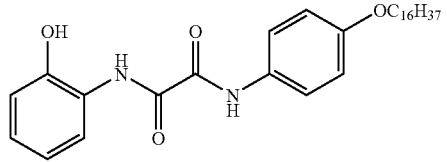
(III-92)
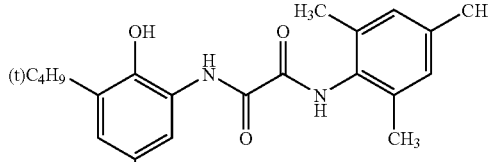
(III-93)
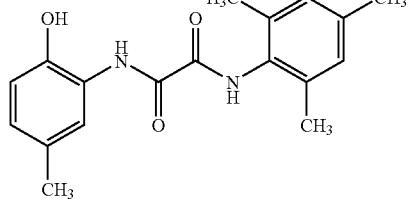
(III-94)
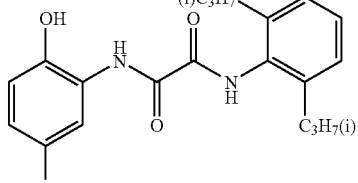
(III-95)
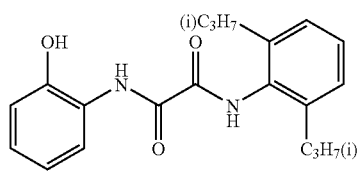
(III-96)
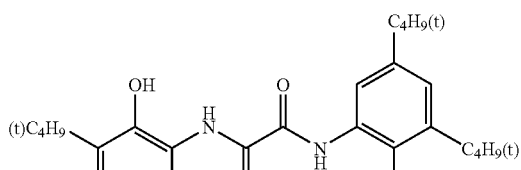
(III-97)
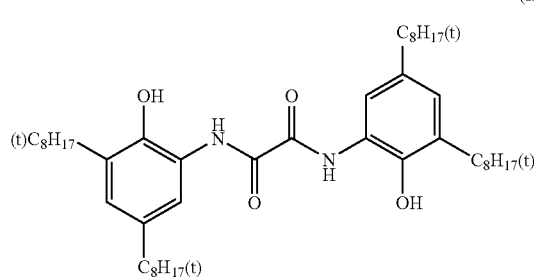
(III-98)
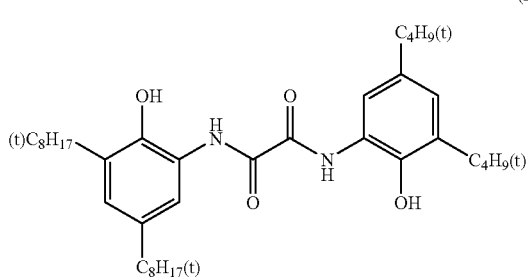

-continued
(III-99) 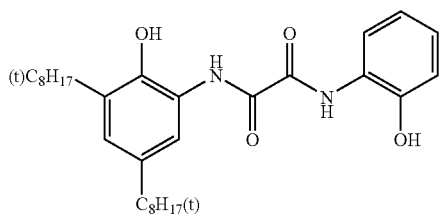
(III-100) 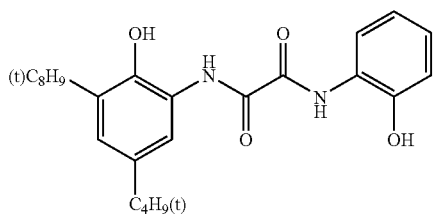
(III-101) 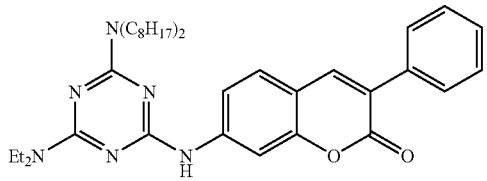
(III-102) 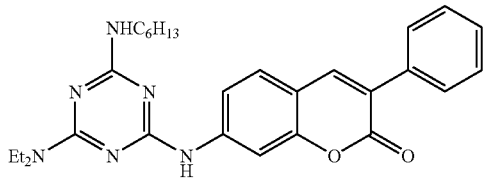
(III-103) 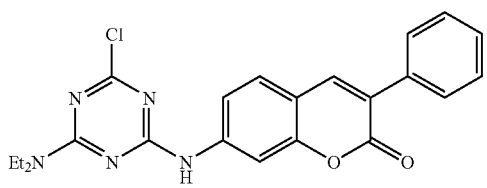
(III-104) 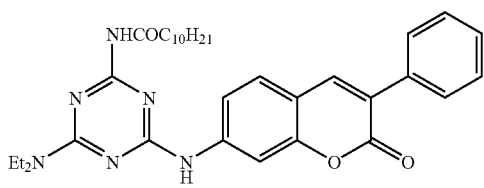
(III-105) 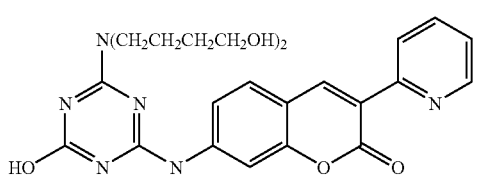
(III-106) 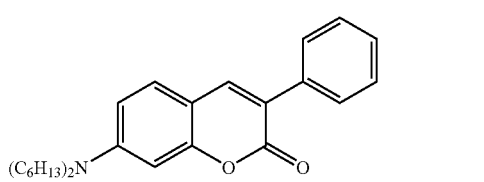
(III-107) 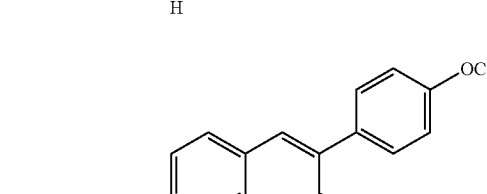
(III-108) 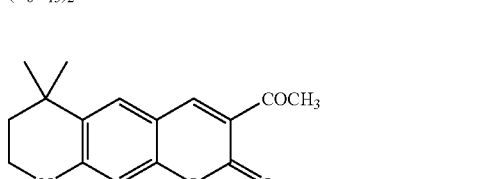
(III-109) 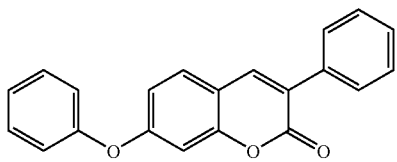
(III-110) 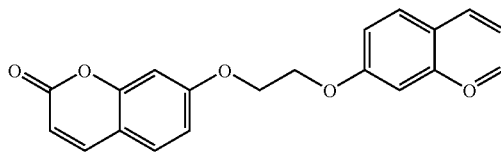
(III-111) 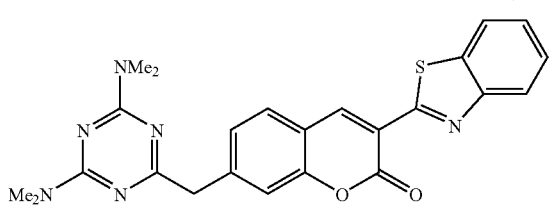
(III-112) 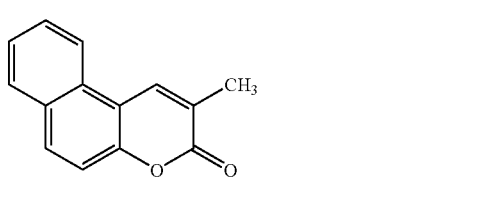
(III-113) 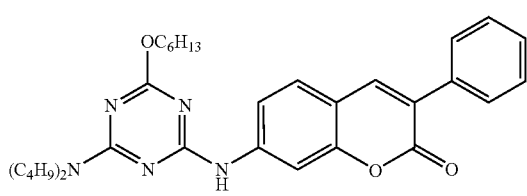
(III-114) 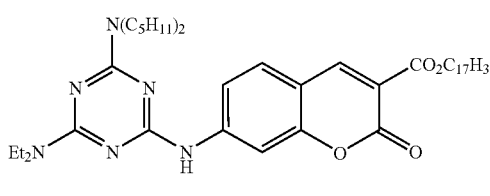

-continued
(III-115)
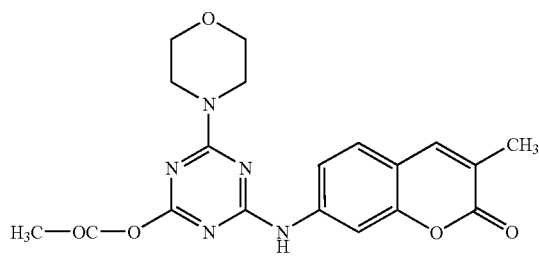
(III-116)
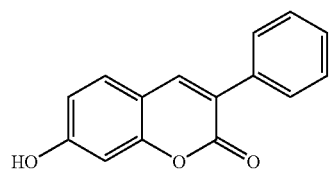
(III-117)
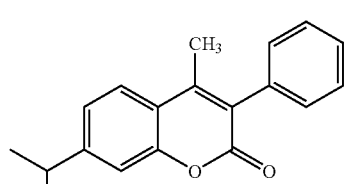
(III-118)
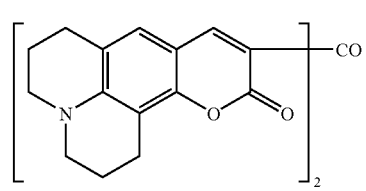
(III-119)
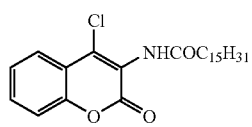
(III-120)
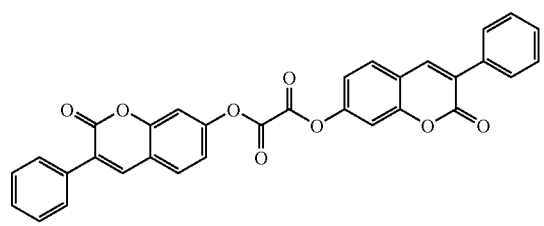
(III-121)
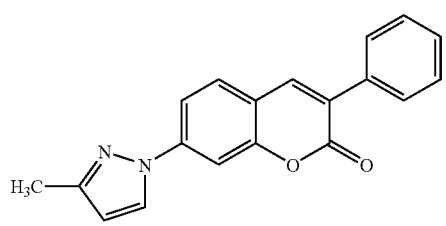
(III-122)
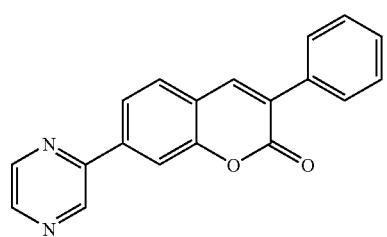
(III-123)
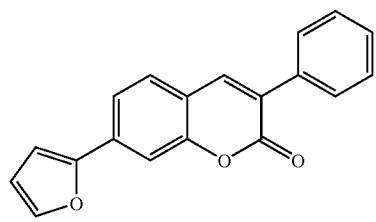
(III-124)
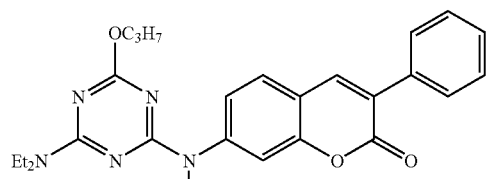
(III-125)
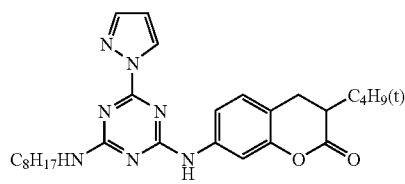
(III-126)
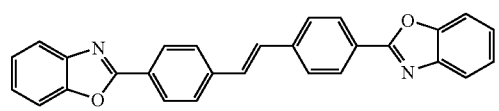
(III-127)
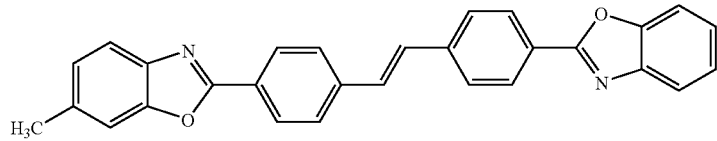

-continued
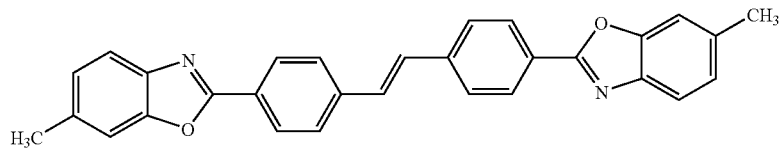
(III-128)
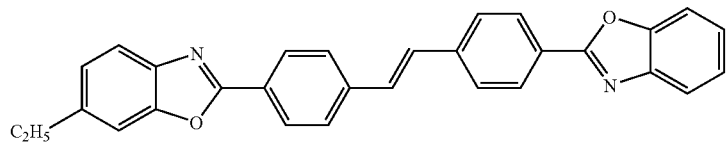
(III-129)
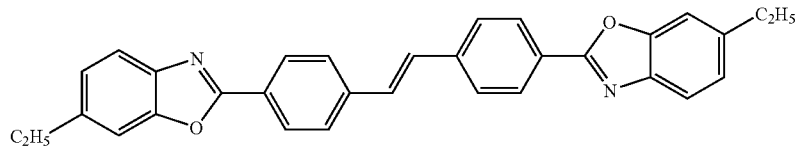
(III-130)
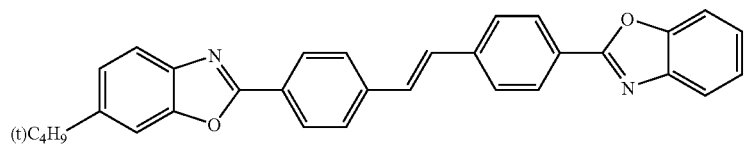
(III-131)
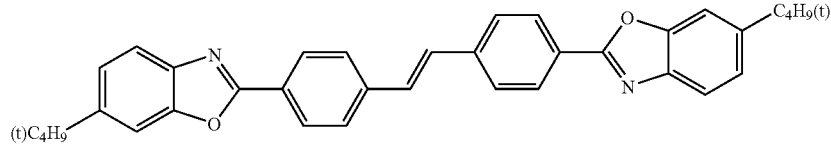
(III-132)
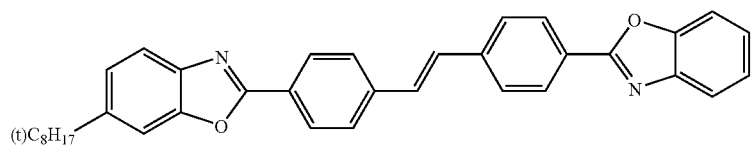
(III-133)
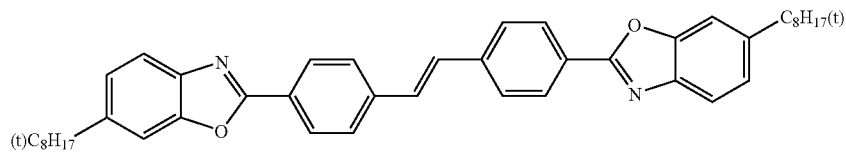
(III-134)
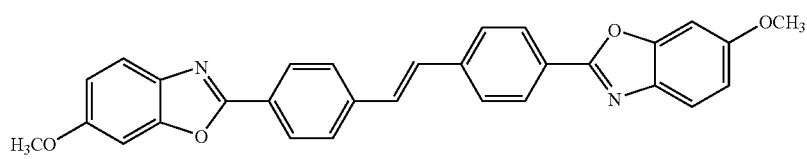
(III-135)
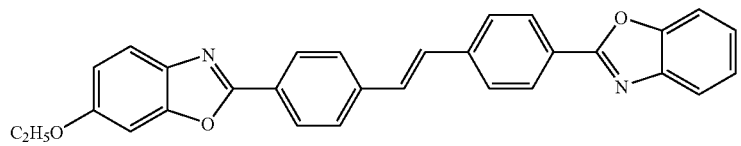
(III-136)

(III-137)
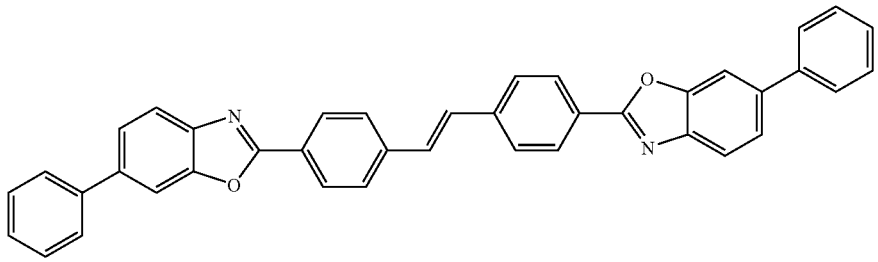
(III-138)
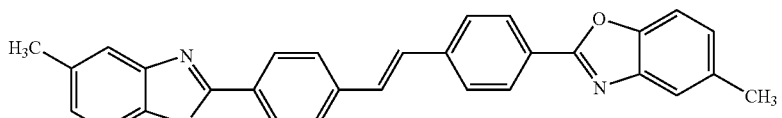
(III-139)
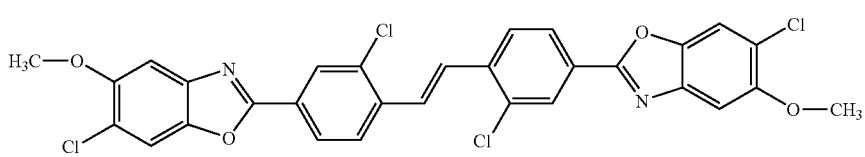
(III-140) (III-141)
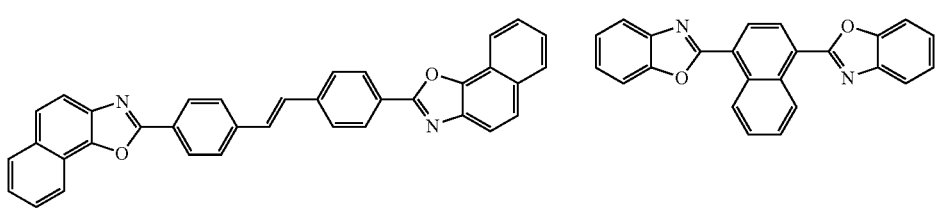 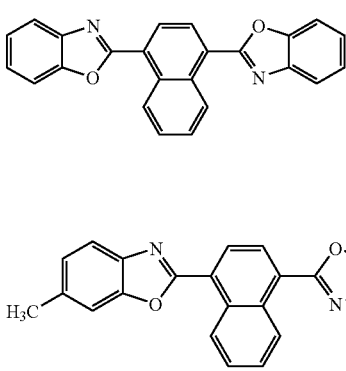
(III-142) (III-143)
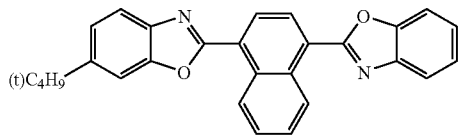 
(III-144) (III-145)
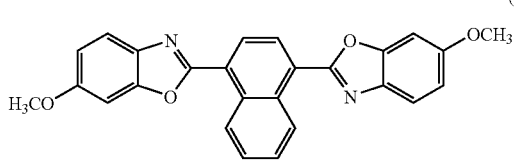 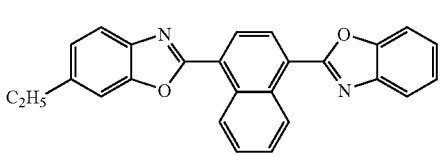
(III-146) (III-147)
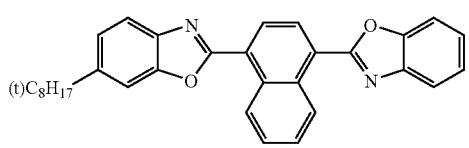 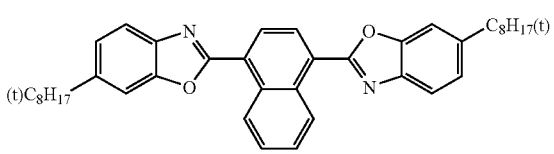
(III-148) (III-149)
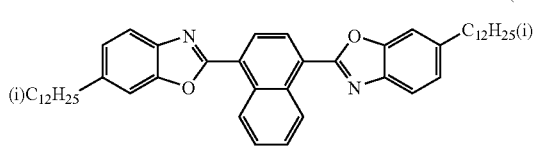 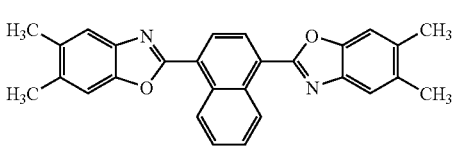
(III-150) (III-151)
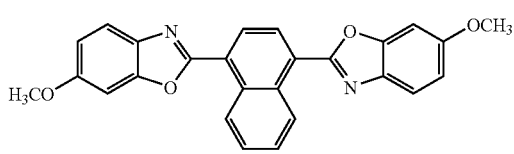

-continued (III-152)
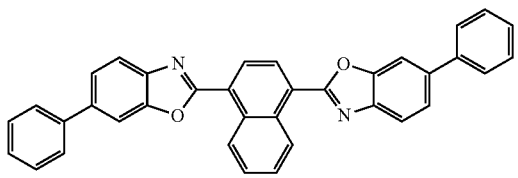

(III-153)
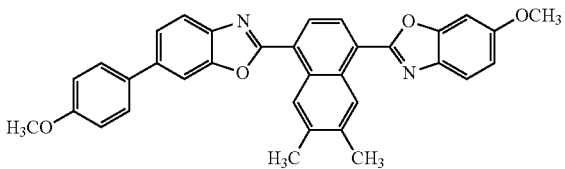

(III-154)
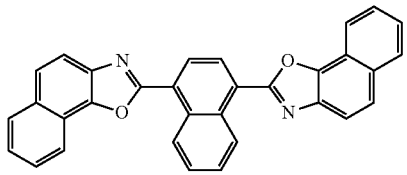

(III-155)
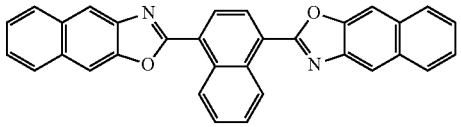

(III-156)
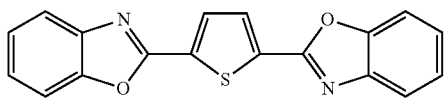

(III-157)
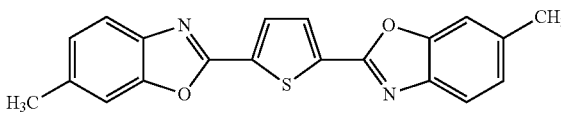

(III-158)
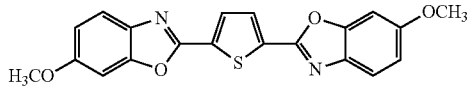

(III-159)
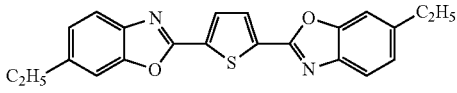

(III-160)
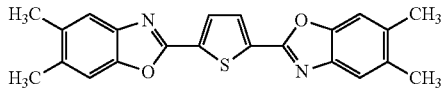

(III-161)
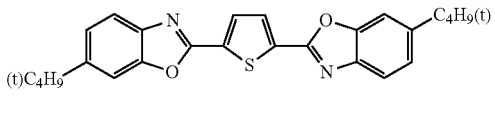

(III-162)
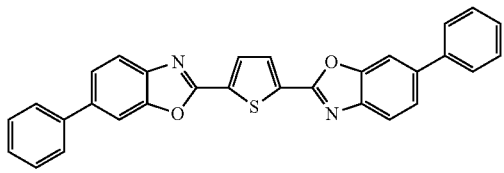

(III-163)
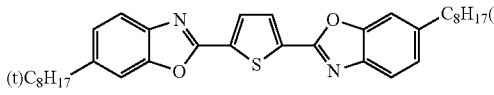

(III-164)
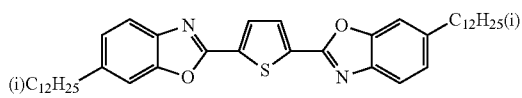

(III-165)
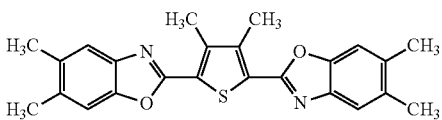

These compounds can be prepared easily in accordance with or on the basis of methods described in JP-B No. S50-25337, U.S. Pat. No. 3,785,827, JP-A No. H05-4449, JP-B No. S48-30492, JP-A No. H02-188573, EP 0684278A1, and Journal of Organic Chemistry, vol. 23, p. 1344 (1958). They may be commercially available products as TINUVIN 109 from Ciba Specialty Chemicals, and may be selected from WHITWEFULUOR products manufactured by Sumitomo Chemical Co., Ltd. HAKKOL products manufactured by Showa Chemical Industry Co., Ltd. HOSTALUX products manufactured by Hoechst, and KAYALIGHT products manufactured by Nippon Kayaku Co., Ltd.

<Content Ratio of Compounds in Near-Infrared Absorbing Material According to the Invention>

In the invention, the total molar amount of the compound(s) 1) is preferably 0.1 mole or more, more preferably 0.1 to 2.0 moles, still more preferably 0.1 to 1.0 mole, and most preferably 0.1 to 0.5 mole with respect to 1 mole of the compound(s) 2).

In the invention, the total molar amount of the compound(s) 3) is preferably 0.1 mole or more, more preferably 0.1 to 2.0 moles, still more preferably 0.1 to 1.0 mole, and most preferably 0.1 to 0.5 mole with respect to 1 mole of the compound(s) 2).

<Application of Near-Infrared Absorbing Material According to the Invention>

The near-infrared absorbing material according to the invention can be used in various applications. Here, a near-infrared absorbing material including the compounds 1), 2) and 3) itself is coated on a substrate such as a paper sheet, a resin sheet, a film, a glass plate, or a metal plate, or kneaded with such raw material of such a substrate, or used in combination of a hard coat or a monomer to form a composition, which are polymerized. In such applications, the near-infrared absorbing material may be dissolved in a solvent to form a solution, or may be used together with a binder or other material. Typical examples of the applications include optical recording media for long-wavelength laser, recording materials for invisible printing, optical filters, architectural or agricultural filters, and painting materials. Among them, the near-infrared absorbing material is preferably used as an optical filter, an architectural or agricultural filter, or a painting material, and is more preferably used as optical filter.

<Method of Producing the Near-Infrared Absorbing Material According to the Invention>

The near-infrared absorbing material according to the invention is prepared, for example, by dissolving or dispersing the compound(s) 1), 2) and 3) in at least one solvent (such as chloroform, methylene chloride, toluene, acetone, methyl ethyl ketone, cyclohexanone, ethyl acetate, dibutyl ether, tetrahydrofuran, or dimethylformamide), or kneading them, which are being heated, with at least one resin (such as ABS resin, polyethylene resin, polypropylene resin, polyvinyl chloride resin, polycarbonate resin, polystyrene resin, polyacrylonitrile resin, methacrylonitrile resin, polymethacrylic ester resin, or polyester resin), or dissolving or dispersing them in at least one solvent and adding at least one resin to the resultant solution or dispersion and heating the resulting mixture to dissolve the resin; and then forming a thin film therefrom and solidifying the thin film, or applying the solution or dispersion or kneaded matter to a resin film.

The near-infrared absorbing material according to the invention, which is superior both in light resistance and other physical properties, can also be used in new applications.

EXAMPLES

Hereinafter, the invention will be described in detail with reference to Examples, but it should be understood that the invention is not limited thereto.

In the following Examples, the compounds 1) (component 1)) in the invention will be called compound (I), the compounds 2) will be called compound (XII), and the compounds 3) will be called compound (III).

Example 1

Preparation of Near-Infrared Absorbing Filter

Ten grams of polystyrene, compounds (I) and (III) whose structures and amounts are shown in Tables 1 and 2, and 0.1 g of exemplary compound (XII-6) were added to 100 ml of chloroform, and the mixture was stirred at 40° C. for 15 minutes to prepare a solution. The solution was coated on a glass plate and the resulting coating was dried by air blow at room temperature to manufacture a sample.

<Light Resistance Test>

The spectroscopic absorption spectrum of the compound (XII-6) was measured and the maximum spectroscopic absorption wavelength was obtained. The absorbance of the exemplary compound (XII-6) contained in the sample was measured at the maximum spectroscopic absorption wavelength. Thereafter, the sample was irradiated with light emitted from a xenon lamp at 95,000 luxes for 3 days. The absorbance of the exemplary compound (XII-6) contained in the irradiated sample was measured at the maximum spectroscopic absorption wavelength. The retention rate was calculated from those measured absorbances, and is used to evaluate the light resistance (light fastness) of the sample.

TABLE 1

| Test No. | Compound (I) Structure | Compound (I) Molar ratio to (XII-6)*1 | Compound (III) Structure | Compound (III) Molar ratio to (XII-6)*1 | Light resistance | Remarks |
|---|---|---|---|---|---|---|
| 101 | None | | None | | 0.08 | Comparative Example |
| 102 | (I-1) | 0.01 | None | | 0.09 | Inventive Example |
| 103 | (I-1) | 0.05 | None | | 0.10 | Inventive Example |
| 104 | (I-1) | 0.1 | None | | 0.37 | Inventive Example |
| 105 | (I-1) | 0.3 | None | | 0.46 | Inventive Example |
| 106 | (I-1) | 0.5 | None | | 0.57 | Inventive Example |
| 107 | (I-1) | 1 | None | | 0.61 | Inventive Example |
| 108 | (I-10) | 0.01 | None | | 0.09 | Inventive Example |
| 109 | (I-10) | 0.05 | None | | 0.11 | Inventive Example |
| 110 | (I-10) | 0.1 | None | | 0.33 | Inventive Example |
| 111 | (I-10) | 0.3 | None | | 0.41 | Inventive Example |
| 112 | (I-10) | 0.5 | None | | 0.55 | Inventive Example |
| 113 | (I-10) | 1 | None | | 0.59 | Inventive Example |
| 114 | (I-33) | 0.01 | None | | 0.08 | Inventive Example |
| 115 | (I-33) | 0.05 | None | | 0.13 | Inventive Example |
| 116 | (I-33) | 0.1 | None | | 0.42 | Inventive Example |
| 117 | (I-33) | 0.3 | None | | 0.51 | Inventive Example |
| 118 | (I-33) | 0.5 | None | | 0.58 | Inventive Example |
| 119 | (I-33) | 1 | None | | 0.62 | Inventive Example |
| 120 | (I-39) | 0.01 | None | | 0.09 | Inventive Example |
| 121 | (I-39) | 0.05 | None | | 0.11 | Inventive Example |
| 122 | (I-39) | 0.1 | None | | 0.26 | Inventive Example |
| 123 | (I-39) | 0.3 | None | | 0.33 | Inventive Example |
| 124 | (I-39) | 0.5 | None | | 0.39 | Inventive Example |
| 125 | (I-39) | 1 | None | | 0.45 | Inventive Example |
| 126 | (I-1)/(I-39) | 0.005 | None | | 0.09 | Inventive Example |
| 127 | (I-1)/(I-39) | 0.025 | None | | 0.11 | Inventive Example |
| 128 | (I-1)/(I-39) | 0.05 | None | | 0.46 | Inventive Example |
| 129 | (I-1)/(I-39) | 0.15 | None | | 0.54 | Inventive Example |
| 130 | (I-1)/(I-39) | 0.25 | None | | 0.69 | Inventive Example |
| 131 | (I-1)/(I-39) | 0.5 | None | | 0.74 | Inventive Example |

Note)
*1 The molar ratio of each of at least one compound (I) to compound (XII-6)

TABLE 2

| Test No. | Compound (I) Structure | Compound (I) Molar ratio to (XII-6)*1 | Compound (III) Structure | Compound (III) Molar ratio to (XII-6)*1 | Light resistance | Remarks |
|---|---|---|---|---|---|---|
| 132 | (I-1) | 0.005 | (III-9) | 0.005 | 0.09 | Inventive Example |
| 133 | (I-1) | 0.025 | (III-9) | 0.025 | 0.13 | Inventive Example |
| 134 | (I-1) | 0.05 | (III-9) | 0.05 | 0.38 | Inventive Example |
| 135 | (I-1) | 0.15 | (III-9) | 0.15 | 0.48 | Inventive Example |
| 136 | (I-1) | 0.25 | (III-9) | 0.25 | 0.62 | Inventive Example |
| 137 | (I-1) | 0.5 | (III-9) | 0.5 | 0.65 | Inventive Example |
| 138 | (I-1) | 0.005 | (III-41) | 0.005 | 0.09 | Inventive Example |
| 139 | (I-1) | 0.025 | (III-41) | 0.025 | 0.20 | Inventive Example |
| 140 | (I-1) | 0.05 | (III-41) | 0.05 | 0.49 | Inventive Example |
| 141 | (I-1) | 0.15 | (III-41) | 0.15 | 0.55 | Inventive Example |
| 142 | (I-1) | 0.25 | (III-41) | 0.25 | 0.58 | Inventive Example |
| 143 | (I-1) | 0.5 | (III-41) | 0.5 | 0.63 | Inventive Example |
| 144 | (I-10) | 0.005 | (III-71) | 0.005 | 0.10 | Inventive Example |
| 145 | (I-10) | 0.025 | (III-71) | 0.025 | 0.15 | Inventive Example |
| 146 | (I-10) | 0.05 | (III-71) | 0.05 | 0.42 | Inventive Example |
| 147 | (I-10) | 0.15 | (III-71) | 0.15 | 0.49 | Inventive Example |
| 148 | (I-10) | 0.25 | (III-71) | 0.25 | 0.54 | Inventive Example |
| 149 | (I-10) | 0.5 | (III-71) | 0.5 | 0.65 | Inventive Example |
| 150 | (I-10) | 0.005 | (III-138) | 0.005 | 0.10 | Inventive Example |
| 151 | (I-10) | 0.025 | (III-138) | 0.025 | 0.20 | Inventive Example |
| 152 | (I-10) | 0.05 | (III-138) | 0.05 | 0.38 | Inventive Example |
| 153 | (I-10) | 0.15 | (III-138) | 0.15 | 0.47 | Inventive Example |
| 154 | (I-10) | 0.25 | (III-138) | 0.25 | 0.59 | Inventive Example |
| 155 | (I-10) | 0.5 | (III-138) | 0.5 | 0.66 | Inventive Example |
| 156 | (I-1)/(I-39) | 0.0025 | (III-9) | 0.005 | 0.09 | Inventive Example |
| 157 | (I-1)/(I-39) | 0.0125 | (III-9) | 0.025 | 0.13 | Inventive Example |
| 158 | (I-1)/(I-39) | 0.025 | (III-9) | 0.05 | 0.39 | Inventive Example |
| 159 | (I-1)/(I-39) | 0.075 | (III-9) | 0.15 | 0.52 | Inventive Example |
| 160 | (I-1)/(I-39) | 0.125 | (III-9) | 0.25 | 0.70 | Inventive Example |
| 161 | (I-1)/(I-39) | 0.25 | (III-9) | 0.5 | 0.77 | Inventive Example |
| 162 | (I-1)/(I-39) | 0.0025 | (III-9)/(III-41) | 0.0025 | 0.10 | Inventive Example |
| 163 | (I-1)/(I-39) | 0.0125 | (III-9)/(III-41) | 0.0125 | 0.19 | Inventive Example |
| 164 | (I-1)/(I-39) | 0.025 | (III-9)/(III-41) | 0.025 | 0.46 | Inventive Example |
| 165 | (I-1)/(I-39) | 0.075 | (III-9)/(III-41) | 0.075 | 0.59 | Inventive Example |
| 166 | (I-1)/(I-39) | 0.125 | (III-9)/(III-41) | 0.125 | 0.72 | Inventive Example |
| 167 | (I-1)/(I-39) | 0.25 | (III-9)/(III-41) | 0.25 | 0.76 | Inventive Example |

Note)
*1 The molar ratio of each of at least one compound (I) or (III) to compound (XII-6)

As shown in Tables 1 and 2, each of the samples according to the invention shows good light resistance and has a significant large effect.

Example 2

Preparation of Near-Infrared Absorbing Filter

Ten grams of polystyrene, compounds (I) and (III) whose structures and amounts are shown in Tables 3 to 7, and 0.1 g of compound (XII) whose structure is shown in Tables 3 to 7 were added to 100 nil of chloroform, and the mixture was stirred at 40° C. for 15 minutes to prepare a solution. The solution was coated on a glass plate and the resulting coating was dried by air blow at room temperature to manufacture a sample.

<Light Resistance Test>

The spectroscopic absorption spectrum of compound (XII) was measured and the maximum spectroscopic absorption wavelength was obtained. The absorbance of the compound (XII) contained in the sample was measured at the maximum spectroscopic absorption wavelength. Thereafter, the sample was irradiated with light emitted from a xenon lamp at 95,000 luxes for 3 days. The absorbance of the compound (XII-6) contained in the irradiated sample was measured at the maximum spectroscopic absorption wavelength. The retention rate was calculated from those measured absorbances, and is used to evaluate the light resistance (light fastness) of the sample.

TABLE 3

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 200 | None | | None | | 0.06 | (XII-4) | Comparative Example |
| 201 | (I-1) | 0.01 | None | | 0.07 | (XII-4) | Inventive Example |
| 202 | (I-1) | 0.05 | None | | 0.09 | (XII-4) | Inventive Example |
| 203 | (I-1) | 0.1 | None | | 0.25 | (XII-4) | Inventive Example |
| 204 | (I-1) | 0.3 | None | | 0.34 | (XII-4) | Inventive Example |
| 205 | (I-1) | 0.5 | None | | 0.38 | (XII-4) | Inventive Example |
| 206 | (I-1) | 1 | None | | 0.42 | (XII-4) | Inventive Example |
| 207 | (I-1) | 0.005 | (III-47) | 0.005 | 0.07 | (XII-4) | Inventive Example |

TABLE 3-continued

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 208 | (I-1) | 0.025 | (III-47) | 0.25 | | (XII-4) 0.10 | Inventive Example |
| 209 | (I-1) | 0.05 | (III-47) | 0.05 | | (XII-4) 0.33 | Inventive Example |
| 210 | (I-1) | 0.15 | (III-47) | 0.15 | | (XII-4) 0.38 | Inventive Example |
| 211 | (I-1) | 0.25 | (III-47) | 0.25 | | (XII-4) 0.46 | Inventive Example |
| 212 | (I-1) | 0.5 | (III-47) | 0.5 | | (XII-4) 0.50 | Inventive Example |
| 213 | (I-2) | 0.01 | None | | | (XII-4) 0.07 | Inventive Example |
| 214 | (I-2) | 0.05 | None | | | (XII-4) 0.09 | Inventive Example |
| 215 | (I-2) | 0.1 | None | | | (XII-4) 0.22 | Inventive Example |
| 216 | (I-2) | 0.3 | None | | | (XII-4) 0.30 | Inventive Example |
| 217 | (I-2) | 0.5 | None | | | (XII-4) 0.36 | Inventive Example |
| 218 | (I-2) | 1 | None | | | (XII-4) 0.38 | Inventive Example |
| 219 | (I-2) | 0.005 | (III-126) | 0.005 | | (XII-4) 0.07 | Inventive Example |
| 220 | (I-2) | 0.025 | (III-126) | 0.025 | | (XII-4) 0.11 | Inventive Example |
| 221 | (I-2) | 0.05 | (III-126) | 0.05 | | (XII-4) 0.39 | Inventive Example |
| 222 | (I-2) | 0.15 | (III-126) | 0.15 | | (XII-4) 0.43 | Inventive Example |

Note)
*1 The molar ratio of each of at least one compound (I) or (III) to compound (XII)

TABLE 4

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 223 | (I-2) | 0.25 | (III-126) | 0.25 | | (XII-4) 0.47 | Inventive Example |
| 224 | (I-2) | 0.5 | (III-126) | 0.5 | | (XII-4) 0.49 | Inventive Example |
| 225 | (I-20) | 0.01 | None | | | (XII-4) 0.07 | Inventive Example |
| 226 | (I-20) | 0.05 | None | | | (XII-4) 0.10 | Inventive Example |
| 227 | (I-20) | 0.1 | None | | | (XII-4) 0.23 | Inventive Example |
| 228 | (I-20) | 0.3 | None | | | (XII-4) 0.27 | Inventive Example |
| 229 | (I-20) | 0.5 | None | | | (XII-4) 0.35 | Inventive Example |
| 230 | (I-20) | 1 | None | | | (XII-4) 0.40 | Inventive Example |
| 231 | (I-20) | 0.005 | (III-9) | 0.005 | | (XII-4) 0.07 | Inventive Example |
| 232 | (I-20) | 0.025 | (III-9) | 0.025 | | (XII-4) 0.10 | Inventive Example |
| 233 | (I-20) | 0.05 | (III-9) | 0.05 | | (XII-4) 0.30 | Inventive Example |
| 234 | (I-20) | 0.15 | (III-9) | 0.15 | | (XII-4) 0.38 | Inventive Example |
| 235 | (I-20) | 0.25 | (III-9) | 0.25 | | (XII-4) 0.44 | Inventive Example |
| 236 | (I-20) | 0.5 | (III-9) | 0.5 | | (XII-4) 0.48 | Inventive Example |
| 237 | (I-20)/(I-36) | 0.005 | None | | | (XII-4) 0.07 | Inventive Example |
| 238 | (I-20)/(I-36) | 0.025 | None | | | (XII-4) 0.10 | Inventive Example |
| 239 | (I-20)/(I-36) | 0.05 | None | | | (XII-4) 0.23 | Inventive Example |
| 240 | (I-20)/(I-36) | 0.15 | None | | | (XII-4) 0.30 | Inventive Example |
| 241 | (I-20)/(I-36) | 0.25 | None | | | (XII-4) 0.38 | Inventive Example |
| 242 | (I-20)/(I-36) | 0.5 | None | | | (XII-4) 0.43 | Inventive Example |
| 243 | (I-20)/(I-36) | 0.0025 | (III-9) | 0.005 | | (XII-4) 0.07 | Inventive Example |
| 244 | (I-20)/(I-36) | 0.0125 | (III-9) | 0.025 | | (XII-4) 0.12 | Inventive Example |
| 245 | (I-20)/(I-36) | 0.025 | (III-9) | 0.05 | | (XII-4) 0.26 | Inventive Example |

Note)
*1 The molar ratio of each of at least one compound (I) or (III) to compound (XII)

TABLE 5

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 246 | (I-20)/(I-36) | 0.075 | (III-9) | 0.15 | | (XII-4) 0.39 | Inventive Example |
| 247 | (I-20)/(I-36) | 0.125 | (III-9) | 0.25 | | (XII-4) 0.44 | Inventive Example |
| 248 | (I-20)/(I-36) | 0.25 | (III-9) | 0.5 | | (XII-4) 0.46 | Inventive Example |
| 249 | (I-20)/(I-36) | 0.0025 | (III-9)/(III-47) | 0.0025 | | (XII-4) 0.07 | Inventive Example |
| 250 | (I-20)/(I-36) | 0.0125 | (III-9)/(III-47) | 0.0125 | | (XII-4) 0.10 | Inventive Example |
| 251 | (I-20)/(I-36) | 0.025 | (III-9)/(III-47) | 0.025 | | (XII-4) 0.31 | Inventive Example |
| 252 | (I-20)/(I-36) | 0.075 | (III-9)/(III-47) | 0.075 | | (XII-4) 0.46 | Inventive Example |
| 253 | (I-20)/(I-36) | 0.125 | (III-9)/(III-47) | 0.125 | | (XII-4) 0.47 | Inventive Example |
| 254 | (I-20)/(I-36) | 0.25 | (III-9)/(III-47) | 0.25 | | (XII-4) 0.48 | Inventive Example |
| 255 | None | | None | | | (XII-16) 0.06 | Comparative Example |
| 256 | (I-52) | 0.01 | None | | | (XII-16) 0.07 | Inventive Example |
| 257 | (I-52) | 0.05 | None | | | (XII-16) 0.09 | Inventive Example |

TABLE 5-continued

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 258 | (I-52) | 0.1 | None | | (XII-16) | 0.28 | Inventive Example |
| 259 | (I-52) | 0.3 | None | | (XII-16) | 0.38 | Inventive Example |
| 260 | (I-52) | 0.5 | None | | (XII-16) | 0.42 | Inventive Example |
| 261 | (I-52) | 1 | None | | (XII-16) | 0.44 | Inventive Example |
| 262 | (I-52) | 0.005 | (III-9) | 0.005 | (XII-16) | 0.09 | Inventive Example |
| 263 | (I-52) | 0.025 | (III-9) | 0.025 | (XII-16) | 0.12 | Inventive Example |
| 264 | (I-52) | 0.05 | (III-9) | 0.05 | (XII-16) | 0.33 | Inventive Example |
| 265 | (I-52) | 0.15 | (III-9) | 0.15 | (XII-16) | 0.45 | Inventive Example |
| 266 | (I-52) | 0.25 | (III-9) | 0.25 | (XII-16) | 0.49 | Inventive Example |
| 267 | (I-52) | 0.5 | (III-9) | 0.5 | (XII-16) | 0.52 | Inventive Example |
| 268 | None | | None | | (XII-17) | 0.05 | Comparative Example |

Note)
*1 The molar ratio of each of at least one compound (I) or (III) to compound (XII)

TABLE 6

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 269 | (I-48) | 0.01 | None | | (XII-17) | 0.07 | Inventive Example |
| 270 | (I-48) | 0.05 | None | | (XII-17) | 0.08 | Inventive Example |
| 271 | (I-48) | 0.1 | None | | (XII-17) | 0.23 | Inventive Example |
| 272 | (I-48) | 0.3 | None | | (XII-17) | 0.33 | Inventive Example |
| 273 | (I-48) | 0.5 | None | | (XII-17) | 0.38 | Inventive Example |
| 274 | (I-48) | 1 | None | | (XII-17) | 0.39 | Inventive Example |
| 275 | (I-48) | 0.005 | (III-9) | 0.005 | (XII-17) | 0.07 | Inventive Example |
| 276 | (I-48) | 0.025 | (III-9) | 0.025 | (XII-17) | 0.08 | Inventive Example |
| 277 | (I-48) | 0.05 | (III-9) | 0.05 | (XII-17) | 0.36 | Inventive Example |
| 278 | (I-48) | 0.15 | (III-9) | 0.15 | (XII-17) | 0.42 | Inventive Example |
| 279 | (I-48) | 0.25 | (III-9) | 0.25 | (XII-17) | 0.49 | Inventive Example |
| 280 | (I-48) | 0.5 | (III-9) | 0.5 | (XII-17) | 0.49 | Inventive Example |
| 281 | (I-48) | 0.005 | (III-9)/(III-11) | 0.0025 | (XII-17) | 0.07 | Inventive Example |
| 282 | (I-48) | 0.025 | (III-9)/(III-11) | 0.0125 | (XII-17) | 0.08 | Inventive Example |
| 283 | (I-48) | 0.05 | (III-9)/(III-11) | 0.025 | (XII-17) | 0.27 | Inventive Example |
| 284 | (I-48) | 0.15 | (III-9)/(III-11) | 0.075 | (XII-17) | 0.38 | Inventive Example |
| 285 | (I-48) | 0.25 | (III-9)/(III-11) | 0.125 | (XII-17) | 0.46 | Inventive Example |
| 286 | (I-48) | 0.5 | (III-9)/(III-11) | 0.25 | (XII-17) | 0.54 | Inventive Example |
| 287 | (I-36) | 0.01 | None | | (XII-17) | 0.06 | Inventive Example |
| 288 | (I-36) | 0.05 | None | | (XII-17) | 0.07 | Inventive Example |
| 289 | (I-36) | 0.1 | None | | (XII-17) | 0.20 | Inventive Example |
| 290 | (I-36) | 0.3 | None | | (XII-17) | 0.28 | Inventive Example |
| 291 | (I-36) | 0.5 | None | | (XII-17) | 0.33 | Inventive Example |

Note)
*1 The molar ratio of each of at least one compound (I) or (III) to compound (XII)

TABLE 7

| Test No. | Compound (I) Structure | Compound (I) Molar ratio to (XII)*1 | Compound (III) Structure | Compound (III) Molar ratio to (XII)*1 | Light resistance | Structure of Compound (XII) | Remarks |
|---|---|---|---|---|---|---|---|
| 292 | (I-36) | 1 | None | | (XII-17) | 0.36 | Inventive Example |
| 293 | (I-36)/(I-48) | 0.0025 | (III-9)/(III-11) | 0.0025 | (XII-17) | 0.07 | Inventive Example |
| 294 | (I-20)/(I-48) | 0.0125 | (III-9)/(III-11) | 0.0125 | (XII-17) | 0.08 | Inventive Example |
| 295 | (I-36)/(I-48) | 0.025 | (III-9)/(III-11) | 0.025 | (XII-17) | 0.34 | Inventive Example |
| 296 | (I-36)/(I-48) | 0.075 | (III-9)/(III-11) | 0.075 | (XII-17) | 0.40 | Inventive Example |
| 297 | (I-36)/(I-48) | 0.125 | (III-9)/(III-11) | 0.125 | (XII-17) | 0.49 | Inventive Example |
| 298 | (I-36)/(I-48) | 0.25 | (III-9)/(III-11) | 0.25 | (XII-17) | 0.57 | Inventive Example |

Note)
*1 The molar ratio of each of at least one compound (I) or (III) to compound (XII)

As shown in Tables 3 and 7, results of the studies in which the structure of the compound (XII) was changed also reveal that the samples according to the invention have good light resistance and a significantly large effect.

A physical property of each of the compounds used in Examples are shown in Tables 8 and 9.

TABLE 8

| Compound | λmax (ε) | Measurement solvent |
|---|---|---|
| I-1 | 278.5 nm | Methanol |
| II-1 | 924 nm | Sulfuric acid |
| II-4 | 843 nm | Tetrahydrofuran |
| II-10 | 842 nm | Tetrahydrofuran |
| II-32 | 828 nm | Tetrahydrofuran |
| III-9 | 349.7 nm ($1.52 \times 10^4$) | Ethyl acetate |
| III-11 | 348 nm ($1.67 \times 10^4$) | Ethyl acetate |
| III-41 | 351.9 nm ($1.91 \times 10^4$) | Ethyl acetate |
| III-47 | 353.1 nm ($2.01 \times 10^4$) | Ethyl acetate |
| III-71 | 299.8 nm ($1.28 \times 10^4$) | Ethyl acetate |
| III-126 | 368.7 nm ($2.55 \times 10^4$) | Ethyl acetate |
| III-138 | 377 nm ($8.63 \times 10^4$) | Chloroform |

TABLE 9

| Compound | Mass spectrum (M/E) |
|---|---|
| I-1 | 117 |
| I-2 | 1176 |
| I-10 | 474 |
| I-20 | 325 |
| I-33 | 904 |
| I-36 | 508 |
| I-39 | 566 |
| I-48 | 340 |
| I-52 | 508 |

The invention claimed is:

1. A near-infrared absorbing material, comprising:
at least two compounds selected from the group consisting of a singlet oxygen scavenger, a radical scavenger, and an antioxidant; and a near-infrared absorbing compound, wherein the near-infrared absorbing compound is a diimmonium salt represented by the following Formula (XII-1):

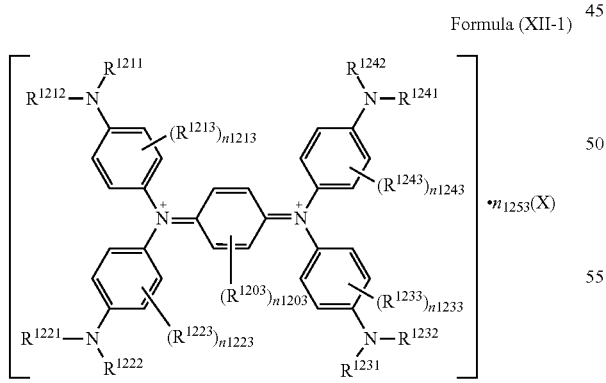

Formula (XII-1)

wherein $R^{1211}$, $R^{1212}$, $R^{1221}$, $R^{1222}$, $R^{1231}$, $R^{1232}$, $R^{1241}$ and $R^{1242}$ independently represent a hydrogen atom, an aliphatic group or an aromatic group; $R^{1203}$, $R^{1213}$, $R^{1223}$, $R^{1233}$ and $R^{1243}$ independently represent a substituent; and $n_{1203}$, $n_{1213}$, $n_{1223}$, $n_{1233}$ and $n_{1243}$ independently represent an integer of 0 to 4; X represents a monovalent or bivalent anion; $n_{1253}$ is 1 or 2; and a product of the valency of X and $n_{1253}$ is 2, and wherein the at least two compounds include a compound represented by the following Formula (I-1) and a compound represented by the following Formula (I-2):

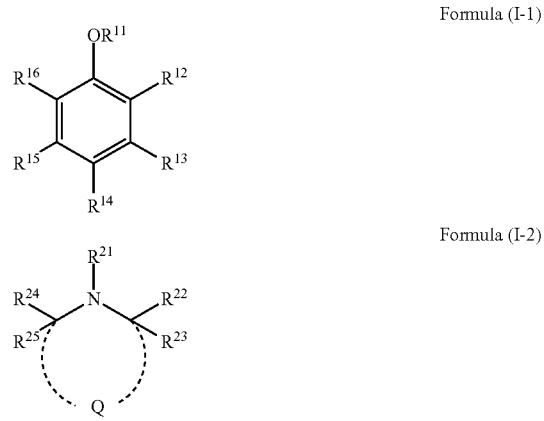

Formula (I-1)

Formula (I-2)

wherein $R^{11}$ represents a hydrogen atom, an aliphatic group, an aromatic group, or a heterocyclic group having a carbon atom that is bonded to an oxygen atom or a hydrolysable protecting group; $R^{12}$ to $R^{16}$ independently represent a hydrogen atom or a substituent; $R^{11}$ and $R^{12}$, $R^{12}$ and $R^{13}$, $R^{13}$ and $R^{14}$, $R^{14}$ and $R^{15}$, $R^{15}$ and $R^{16}$, and/or $R^{16}$ and $R^{11}$ may be bonded to each other to form a ring; $R^{21}$ represents a hydrogen atom, an aliphatic group, an acyl group, a sulfonyl group, a sulfinyl group, an oxy radial group or a hydroxyl group; Q represents a non-metal atomic group necessary for, together with a nitrogen atom and two carbon atoms, forming a five-, six- or seven-membered ring; $R^{22}$ to $R^{25}$ independently represent a hydrogen atom, an aliphatic group, an aromatic group or a heterocyclic group having a carbon atom that is bonded to the carbon atom of the five-, six, or seven-membered ring; and $R^{21}$ and $R^{22}$, $R^{22}$ and $R^{23}$, $R^{24}$ and $R^{25}$, and/or $R^{21}$ and $R^{24}$ may be bonded to each other to form a ring:

wherein the compound represented by Formula (I-1) is selected from the group consisting of the following compounds:

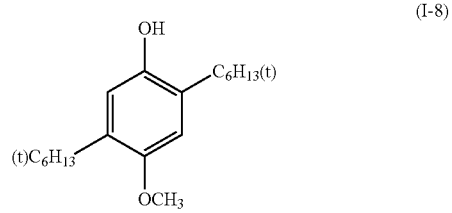

(I-8)

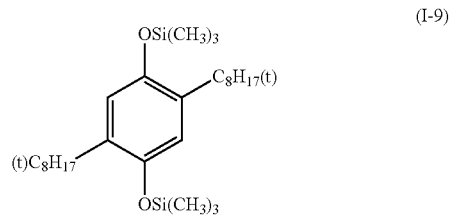

(I-9)

-continued (I-10)
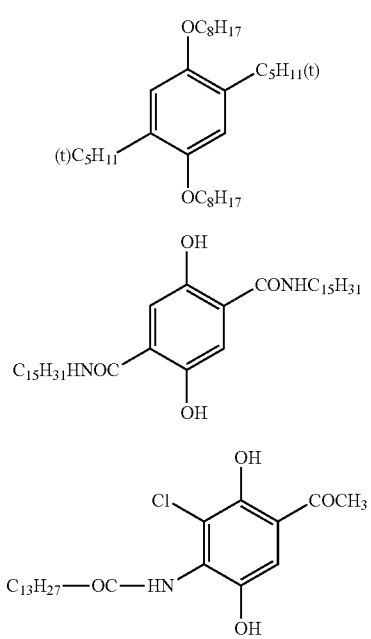
(I-11)
(I-18)
(I-23)
(I-26)
(I-27)
(I-28)
(I-31)
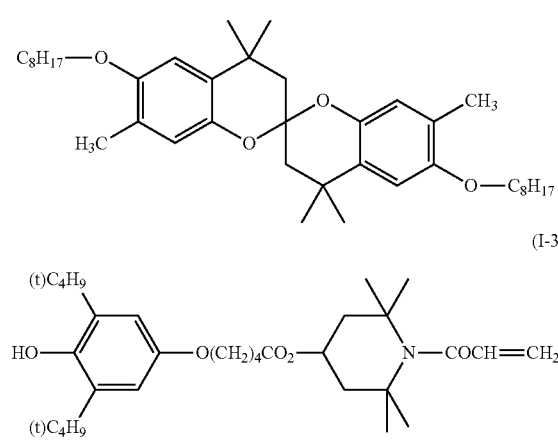

-continued (I-50)
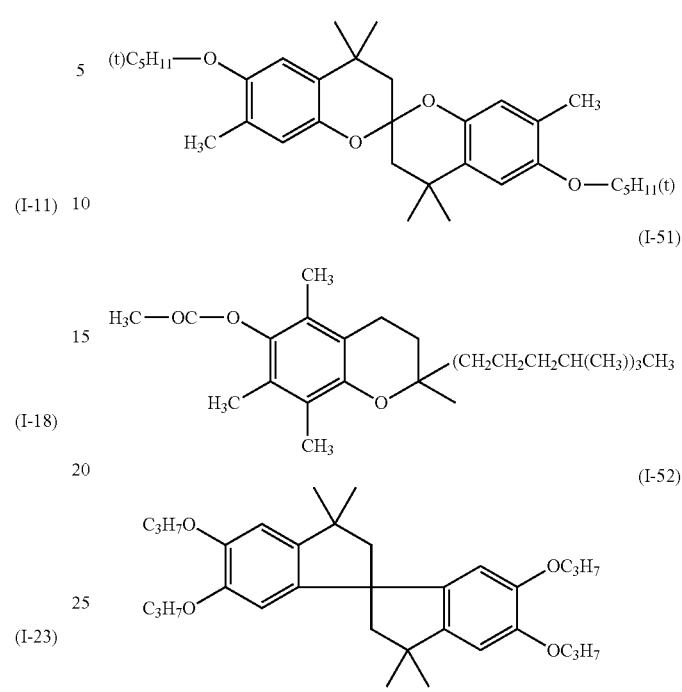
(I-51)
(I-52)

and wherein a total molar amount of the at least two compounds selected from the group consisting of a singlet oxygen scavenger, a radical scavenger and an antioxidant is from 0.005 mol to 2.0 mol per 1 mol of the near-infrared absorbing compound; the near-infrared absorbing material further comprising at least one compound selected from the group consisting of an ultraviolet absorbent and a fluorescent brightener, wherein the at least one compound selected from the group consisting of an ultraviolet absorbent and a fluorescent brightener has a maximum spectroscopic absorption wavelength when in solution of 410 nm or less in a wavelength range of 270 to 1,600 nm.

2. The near-infrared absorbing material of claim 1, wherein the at least one compound selected from the group consisting of an ultraviolet absorbent and a fluorescent brightener comprises a compound represented by any one of the following Formulae (III-1) to (III-9):

Formula (III-1)
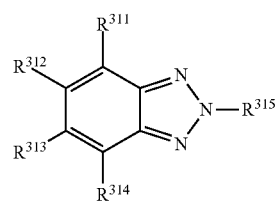

Formula (III-2)
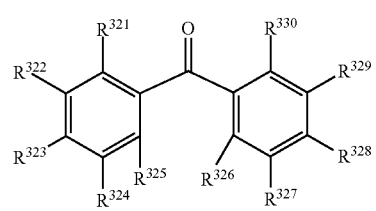

-continued

Formula (III-3)

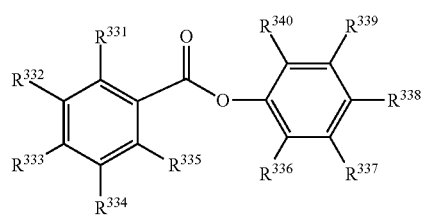

Formula (III-4)

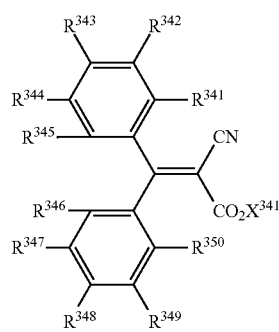

Formula (III-5)

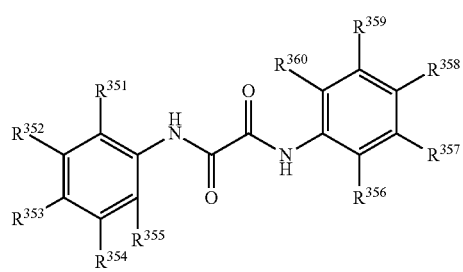

Formula (III-6)

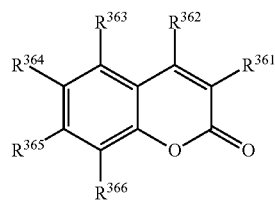

Formula (III-7)

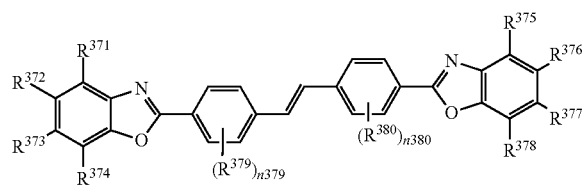

-continued

Formula (III-8)

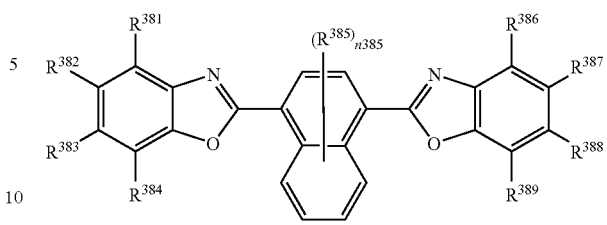

Formula (III-9)

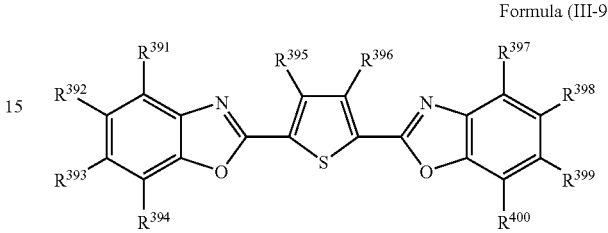

wherein $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ independently represent a hydrogen atom or a substituent; $R^{315}$ represents a hydrogen atom, an aliphatic group, an aromatic group or a heterocyclic group having a carbon atom that is bonded to the nitrogen atom of the ring of Formula (III-1); $R^{379}$, $R^{380}$ and $R^{385}$ represent a substituent; $X^{341}$ represents a hydrogen atom, an aliphatic group, an aromatic group or a heterocyclic group having a carbon atom that is bonded to the oxygen atom of a carbonyloxy group; $n_{379}$ and $n_{380}$ independently represent an integer of 0 to 4; when $n_{379}$ or $n_{380}$ is 2 or more, a plurality of groups $R^{379}$ or $R^{380}$ may be the same as or different from each other; $n_{385}$ represents an integer of 0 to 6; when $n_{385}$ is 2 or more, a plurality of groups $R^{385}$ may be the same as or different from each other; and neighboring groups may be bonded to each other to form a ring.

3. The near-infrared absorbing material of claim 1, comprising at least two compounds selected from the group consisting of ultraviolet absorbent(s) and fluorescent brightener(s).

4. The near-infrared absorbing material of claim 1, wherein a total molar amount of the at least one compound selected from the group consisting of an ultraviolet absorbent and a fluorescent brightener is 0.1 mol or more per 1 mol of the near-infrared absorbing compound.

* * * * *